(12) United States Patent
McCann et al.

(10) Patent No.: US 9,219,677 B2
(45) Date of Patent: Dec. 22, 2015

(54) METHODS, SYSTEMS, AND COMPUTER READABLE MEDIA FOR CENTRALIZED ROUTING AND CALL INSTANCE CODE MANAGEMENT FOR BEARER INDEPENDENT CALL CONTROL (BICC) SIGNALING MESSAGES

(75) Inventors: Thomas M. McCann, Raleigh, NC (US); Petrus Wilhelmus Adrianus Jacobus Maria Nas, Gravenhage (NL); Apirux Bantukul, Cary, NC (US); Jeffrey A. Craig, Durham, NC (US); Peter J. Marsico, Chapel Hill, NC (US)

(73) Assignee: Tekelec Global, Inc., Morrisville, NC (US)

( * ) Notice: Subject to any disclaimer, the term of this patent is extended or adjusted under 35 U.S.C. 154(b) by 318 days.

(21) Appl. No.: 12/689,702

(22) Filed: Jan. 19, 2010

(65) Prior Publication Data
US 2010/0202446 A1 Aug. 12, 2010

Related U.S. Application Data

(60) Provisional application No. 61/145,517, filed on Jan. 16, 2009.

(51) Int. Cl.
*H04L 12/701* (2013.01)
*H04L 12/725* (2013.01)
(Continued)

(52) U.S. Cl.
CPC .............. *H04L 45/00* (2013.01); *H04L 45/304* (2013.01); *H04L 45/42* (2013.01); *H04Q 3/0025* (2013.01); *H04Q 3/0045* (2013.01)

(58) Field of Classification Search
CPC ....... H04L 45/00; H04L 45/304; H04L 45/42; H04Q 3/0025; H04Q 3/0045

USPC ........... 370/352, 338, 467, 410, 401; 455/405
See application file for complete search history.

(56) References Cited

U.S. PATENT DOCUMENTS 3,917,915 A 11/1975 Karras
4,162,377 A 7/1979 Mearns
(Continued)

FOREIGN PATENT DOCUMENTS

CN 101682674 B 11/2013
EP 0 088 639 9/1983
(Continued)

OTHER PUBLICATIONS

Official Action for U.S. Appl. No. 11/731,772 (Aug. 24, 2011).
(Continued)

*Primary Examiner* — Khaled Kassim
(74) *Attorney, Agent, or Firm* — Jenkins, Wilson, Taylor & Hunt, P.A.

(57) ABSTRACT

The subject matter described herein includes methods, systems and computer readable media for centralized routing and call instance code management for bearer independent call control (BICC) signaling messages. One aspect of the subject matter described herein includes a system for routing BICC signaling messages and managing call instance code assignments. The system includes a BICC signaling router. The BICC signaling router includes a routing module for centralized routing of BICC signaling messages between a plurality of BICC signaling nodes. The BICC signaling router further includes a call instance code management module for centralized assignment of call instance codes for BICC signaling sessions routed through the BICC signaling router.

17 Claims, 20 Drawing Sheets

(51) Int. Cl.
*H04L 12/717* (2013.01)
*H04Q 3/00* (2006.01)

(56) References Cited

U.S. PATENT DOCUMENTS

| | | | |
|---|---|---|---|
| 4,191,860 A | 3/1980 | Weber | |
| 4,310,727 A | 1/1982 | Lawser | |
| 4,313,035 A | 1/1982 | Jordan et al. | |
| 4,385,206 A | 5/1983 | Bradshaw et al. | |
| 4,754,479 A | 6/1988 | Bicknell et al. | |
| 4,756,020 A | 7/1988 | Fodale | |
| 4,757,267 A | 7/1988 | Riskin | |
| 4,769,834 A | 9/1988 | Billinger et al. | |
| 4,788,718 A | 11/1988 | McNabb et al. | |
| 4,897,835 A | 1/1990 | Gaskill et al. | |
| 4,897,870 A | 1/1990 | Golden | |
| 4,959,849 A | 9/1990 | Bhusri | |
| 4,972,461 A | 11/1990 | Brown et al. | |
| 5,008,929 A | 4/1991 | Olsen et al. | |
| 5,142,622 A | 8/1992 | Owens | |
| 5,150,357 A | 9/1992 | Hopner et al. | |
| 5,208,811 A | 5/1993 | Kashio et al. | |
| 5,239,542 A | 8/1993 | Breidenstein et al. | |
| 5,291,481 A | 3/1994 | Doshi et al. | |
| 5,315,580 A | 5/1994 | Phaal | |
| 5,315,641 A | 5/1994 | Montgomery et al. | |
| 5,341,608 A | 8/1994 | Mains, Jr. | |
| 5,384,840 A | 1/1995 | Blatchford et al. | |
| 5,402,474 A | 3/1995 | Miller et al. | |
| 5,404,395 A | 4/1995 | Bogart et al. | |
| 5,418,844 A | 5/1995 | Morrisey et al. | |
| 5,420,916 A | 5/1995 | Sekiguchi | |
| 5,426,688 A | 6/1995 | Anand | |
| 5,430,709 A | 7/1995 | Galloway | |
| 5,430,727 A | 7/1995 | Callon | |
| 5,438,570 A | 8/1995 | Karras et al. | |
| 5,457,692 A | 10/1995 | Ishinabe et al. | |
| 5,457,729 A | 10/1995 | Hamann et al. | |
| 5,473,596 A | 12/1995 | Garafola et al. | |
| 5,475,732 A | 12/1995 | Pester, III | |
| 5,481,603 A | 1/1996 | Gutierrez et al. | |
| 5,506,893 A | 4/1996 | Buscher et al. | |
| 5,509,010 A | 4/1996 | La Porta et al. | |
| 5,521,902 A | 5/1996 | Ferguson | |
| 5,533,107 A | 7/1996 | Irwin et al. | |
| 5,539,804 A | 7/1996 | Hong et al. | |
| 5,546,398 A | 8/1996 | Tucker et al. | |
| 5,550,914 A | 8/1996 | Clarke et al. | |
| 5,568,487 A | 10/1996 | Sitbon et al. | |
| 5,572,579 A | 11/1996 | Orriss et al. | |
| 5,579,371 A | 11/1996 | Aridas et al. | |
| 5,581,558 A | 12/1996 | Horney, II et al. | |
| 5,583,926 A | 12/1996 | Venier et al. | |
| 5,583,927 A | 12/1996 | Ely et al. | |
| 5,586,177 A | 12/1996 | Farris et al. | |
| 5,592,530 A | 1/1997 | Brockman et al. | |
| 5,598,464 A | 1/1997 | Hess et al. | |
| 5,602,909 A | 2/1997 | Carkner et al. | |
| 5,606,600 A | 2/1997 | Elliott | |
| 5,610,969 A | 3/1997 | McHenry et al. | |
| 5,610,977 A | 3/1997 | Williams et al. | |
| 5,625,681 A | 4/1997 | Butler, II | |
| 5,638,431 A | 6/1997 | Everett et al. | |
| 5,640,446 A | 6/1997 | Everett et al. | |
| 5,651,002 A | 7/1997 | Van Seters et al. | |
| 5,657,452 A | 8/1997 | Kralowetz et al. | |
| 5,664,102 A | 9/1997 | Faynberg | |
| 5,671,225 A | 9/1997 | Hooper et al. | |
| 5,675,635 A | 10/1997 | Vos et al. | |
| 5,680,552 A | 10/1997 | Netravali et al. | |
| 5,684,951 A | 11/1997 | Goldman et al. | |
| 5,689,555 A | 11/1997 | Sonnenberg | |
| 5,696,809 A | 12/1997 | Voit | |
| 5,696,816 A | 12/1997 | Sonnenberg | |
| 5,701,301 A | 12/1997 | Weisser, Jr. | |
| 5,706,286 A | 1/1998 | Reiman et al. | |
| 5,711,011 A | 1/1998 | Urs et al. | |
| 5,712,903 A | 1/1998 | Bartholomew et al. | |
| 5,712,908 A | 1/1998 | Brinkman et al. | |
| 5,732,213 A | 3/1998 | Gessel et al. | |
| 5,740,239 A | 4/1998 | Bhagat et al. | |
| 5,740,374 A | 4/1998 | Raffali-Schreinemachers | |
| 5,757,895 A | 5/1998 | Aridas et al. | |
| 5,761,281 A | 6/1998 | Baum et al. | |
| 5,761,500 A | 6/1998 | Gallant et al. | |
| 5,764,745 A | 6/1998 | Chan et al. | |
| 5,764,750 A | 6/1998 | Chau et al. | |
| 5,764,955 A | 6/1998 | Doolan | |
| 5,768,352 A | 6/1998 | Elliott et al. | |
| 5,768,358 A | 6/1998 | Venier et al. | |
| 5,768,361 A | 6/1998 | Cowgill | |
| 5,768,525 A | 6/1998 | Kralowetz et al. | |
| 5,771,284 A | 6/1998 | Sonnenberg | |
| 5,774,532 A | 6/1998 | Gottlieb et al. | |
| 5,774,695 A | 6/1998 | Autrey et al. | |
| 5,781,534 A | 7/1998 | Perlman et al. | |
| 5,784,443 A | 7/1998 | Chapman et al. | |
| 5,787,255 A | 7/1998 | Parlan et al. | |
| 5,793,771 A | 8/1998 | Darland et al. | |
| 5,796,813 A | 8/1998 | Sonnenberg | |
| 5,802,285 A | 9/1998 | Hirviniemi | |
| 5,805,587 A | 9/1998 | Norris et al. | |
| 5,812,639 A | 9/1998 | Bartholomew et al. | |
| 5,812,781 A | 9/1998 | Fahlman et al. | |
| 5,815,669 A | 9/1998 | Lee et al. | |
| 5,828,844 A | 10/1998 | Civanlar et al. | |
| 5,835,583 A | 11/1998 | Hetz et al. | |
| 5,838,683 A | 11/1998 | Corley et al. | |
| 5,852,660 A | 12/1998 | Lindquist et al. | |
| 5,867,495 A | 2/1999 | Elliott et al. | |
| 5,867,558 A | 2/1999 | Swanson | |
| 5,870,565 A | 2/1999 | Glitho | |
| 5,872,782 A | 2/1999 | Dendi | |
| 5,878,126 A | 3/1999 | Velamuri et al. | |
| 5,878,129 A | 3/1999 | Figurski et al. | |
| 5,889,954 A | 3/1999 | Gessel et al. | |
| 5,892,822 A | 4/1999 | Gottlieb et al. | |
| 5,903,726 A | 5/1999 | Donovan et al. | |
| 5,912,887 A | 6/1999 | Sehgal | |
| 5,915,222 A | 6/1999 | Olsson et al. | |
| 5,917,900 A | 6/1999 | Allison et al. | |
| 5,920,562 A | 7/1999 | Christie et al. | |
| 5,923,659 A | 7/1999 | Curry et al. | |
| 5,926,482 A | 7/1999 | Christie et al. | |
| 5,940,598 A | 8/1999 | Strauss et al. | |
| 5,949,871 A | 9/1999 | Kabay et al. | |
| 5,958,016 A | 9/1999 | Chang et al. | |
| 5,974,052 A | 10/1999 | Johnson et al. | |
| 5,991,301 A | 11/1999 | Christie | |
| 5,995,608 A | 11/1999 | Detampel, Jr. et al. | |
| 5,995,822 A | 11/1999 | Smith et al. | |
| 5,999,525 A | 12/1999 | Krishnaswamy et al. | |
| 6,006,098 A | 12/1999 | Rathnasabapathy et al. | |
| 6,009,160 A | 12/1999 | Sonnenberg | |
| 6,011,780 A | 1/2000 | Vaman et al. | |
| 6,011,794 A | 1/2000 | Mordowitz et al. | |
| 6,011,803 A | 1/2000 | Bicknell et al. | |
| 6,014,379 A | 1/2000 | White et al. | |
| 6,018,515 A | 1/2000 | Sorber | |
| 6,021,126 A | 2/2000 | White et al. | |
| 6,023,502 A | 2/2000 | Bouanaka et al. | |
| 6,026,091 A | 2/2000 | Christie et al. | |
| 6,028,914 A | 2/2000 | Lin et al. | |
| 6,047,005 A | 4/2000 | Sherman et al. | |
| 6,055,302 A | 4/2000 | Schmersel et al. | |
| 6,061,432 A | 5/2000 | Wallace et al. | |
| 6,064,653 A | 5/2000 | Farris | |
| 6,067,546 A | 5/2000 | Lund | |
| 6,069,890 A | 5/2000 | White et al. | |
| 6,075,783 A | 6/2000 | Voit | |
| 6,076,121 A | 6/2000 | Levine | |
| 6,078,582 A | 6/2000 | Curry et al. | |
| 6,079,036 A | 6/2000 | Moharram | |
| 6,084,892 A | 7/2000 | Benash et al. | |

(56) References Cited

U.S. PATENT DOCUMENTS

| | | | |
|---|---|---|---|
| 6,084,956 A | 7/2000 | Turner et al. |
| 6,091,957 A | 7/2000 | Larkins et al. |
| 6,091,959 A | 7/2000 | Souissi et al. |
| 6,094,437 A | 7/2000 | Loehndorf, Jr. et al. |
| 6,094,573 A | 7/2000 | Heinonen et al. |
| 6,097,719 A | 8/2000 | Benash et al. |
| 6,097,805 A | 8/2000 | Figurski et al. |
| 6,097,960 A | 8/2000 | Rathnasabapathy et al. |
| 6,108,332 A | 8/2000 | Kasiviswanathan |
| 6,108,782 A | 8/2000 | Fletcher et al. |
| 6,111,893 A | 8/2000 | Volftsun et al. |
| 6,111,946 A | 8/2000 | O'Brien |
| 6,112,090 A | 8/2000 | Valentine |
| 6,115,383 A | 9/2000 | Bell et al. |
| 6,115,754 A | 9/2000 | Landgren |
| 6,118,779 A | 9/2000 | Madonna |
| 6,118,780 A | 9/2000 | Dunn et al. |
| 6,119,014 A | 9/2000 | Alperovich et al. |
| 6,119,160 A | 9/2000 | Zhang et al. |
| 6,122,255 A | 9/2000 | Bartholomew et al. |
| 6,122,263 A | 9/2000 | Dahlin et al. |
| 6,122,365 A | 9/2000 | Yegoshin |
| 6,122,510 A | 9/2000 | Granberg |
| 6,125,111 A | 9/2000 | Snow et al. |
| 6,125,177 A | 9/2000 | Whittaker |
| H1880 H | 10/2000 | Vines et al. |
| H1896 H | 10/2000 | Hoffpauir et al. |
| 6,128,304 A | 10/2000 | Gardell et al. |
| 6,128,377 A | 10/2000 | Sonnenberg |
| 6,128,379 A | 10/2000 | Smyk |
| 6,134,235 A | 10/2000 | Goldman et al. |
| 6,134,246 A | 10/2000 | Cai et al. |
| 6,134,307 A | 10/2000 | Brouckman et al. |
| 6,134,314 A | 10/2000 | Dougherty et al. |
| 6,134,316 A | 10/2000 | Kallioniemi et al. |
| 6,134,432 A | 10/2000 | Holmes et al. |
| 6,134,618 A | 10/2000 | Hebert |
| 6,137,869 A | 10/2000 | Voit et al. |
| 6,137,874 A | 10/2000 | Brown et al. |
| 6,138,007 A | 10/2000 | Bharatia |
| 6,138,023 A | 10/2000 | Agarwal et al. |
| 6,144,663 A | 11/2000 | Hallenstal |
| 6,144,667 A | 11/2000 | Doshi et al. |
| 6,144,670 A | 11/2000 | Sponaugle et al. |
| 6,151,390 A | 11/2000 | Volftsun et al. |
| 6,154,467 A | 11/2000 | Hager et al. |
| 6,157,710 A | 12/2000 | Figurski et al. |
| 6,161,012 A | 12/2000 | Fenton et al. |
| 6,181,937 B1 | 1/2001 | Joensuu |
| 6,182,086 B1 | 1/2001 | Lomet et al. |
| 6,185,289 B1 | 2/2001 | Hetz et al. |
| 6,188,752 B1 | 2/2001 | Lesley |
| 6,195,425 B1 | 2/2001 | Farris |
| 6,201,804 B1 | 3/2001 | Kikinis |
| 6,215,783 B1 | 4/2001 | Neyman |
| 6,215,790 B1 | 4/2001 | Voit et al. |
| 6,219,551 B1 | 4/2001 | Hentilä et al. |
| 6,236,722 B1 | 5/2001 | Gilbert et al. |
| 6,249,572 B1 | 6/2001 | Brockman et al. |
| 6,252,952 B1 | 6/2001 | Kung et al. |
| 6,272,136 B1 | 8/2001 | Lin et al. |
| 6,285,753 B1 | 9/2001 | Slusher |
| 6,301,609 B1 | 10/2001 | Aravamudan et al. |
| 6,304,565 B1 | 10/2001 | Ramamurthy |
| 6,321,268 B1 | 11/2001 | Dillon et al. |
| 6,324,183 B1 | 11/2001 | Miller et al. |
| 6,327,350 B1 | 12/2001 | Spangler et al. |
| 6,333,931 B1 | 12/2001 | LaPier et al. |
| 6,359,979 B1 | 3/2002 | Wang et al. |
| 6,363,411 B1 | 3/2002 | Dugan et al. |
| 6,366,655 B1 | 4/2002 | Book et al. |
| 6,373,930 B1 | 4/2002 | McConnell et al. |
| 6,393,269 B1 | 5/2002 | Hartmaier et al. |
| 6,411,632 B2 | 6/2002 | Lindgren et al. |
| 6,424,621 B1 | 7/2002 | Ramaswamy et al. |
| 6,430,176 B1 | 8/2002 | Christie, IV |
| 6,434,155 B1 | 8/2002 | Jones et al. |
| 6,438,223 B1 | 8/2002 | Eskafi et al. |
| 6,445,785 B1 | 9/2002 | Chan et al. |
| 6,446,127 B1 | 9/2002 | Schuster et al. |
| 6,453,018 B2 | 9/2002 | Henry et al. |
| 6,453,034 B1 | 9/2002 | Donovan et al. |
| 6,453,158 B2 | 9/2002 | Donovan et al. |
| 6,456,708 B1 | 9/2002 | Copley et al. |
| 6,466,796 B1 | 10/2002 | Jacobson et al. |
| 6,470,179 B1 | 10/2002 | Chow et al. |
| 6,480,588 B1 | 11/2002 | Donovan |
| 6,483,837 B1 | 11/2002 | Howell et al. |
| 6,483,842 B1 | 11/2002 | Mauger |
| 6,496,512 B1 | 12/2002 | Medhat |
| 6,496,690 B1 | 12/2002 | Cobo et al. |
| 6,507,649 B1 | 1/2003 | Tovander |
| 6,510,164 B1 | 1/2003 | Ramaswamy et al. |
| 6,515,997 B1 | 2/2003 | Feltner et al. |
| 6,516,194 B2 | 2/2003 | Hanson |
| 6,535,727 B1 | 3/2003 | Abbasi et al. |
| 6,564,261 B1 | 5/2003 | Gudjonsson et al. |
| 6,571,094 B1 | 5/2003 | Begeja et al. |
| 6,574,481 B1 | 6/2003 | Rathnasabapathy et al. |
| 6,584,183 B2 | 6/2003 | Manto |
| 6,584,190 B1 | 6/2003 | Bressler |
| 6,594,258 B1 | 7/2003 | Larson et al. |
| 6,606,668 B1 | 8/2003 | MeLampy et al. |
| 6,611,516 B1 | 8/2003 | Pirkola et al. |
| 6,631,133 B1 | 10/2003 | Christie et al. |
| 6,633,764 B1 | 10/2003 | Garcia |
| 6,636,504 B1 | 10/2003 | Albers et al. |
| 6,639,981 B1 | 10/2003 | Dunn, Jr. et al. |
| 6,647,113 B2 | 11/2003 | McCann et al. |
| 6,668,051 B1 | 12/2003 | Ashdown et al. |
| 6,674,748 B1 | 1/2004 | Dykhuizen et al. |
| 6,678,242 B1 | 1/2004 | Simon |
| 6,718,018 B2 | 4/2004 | Henry et al. |
| 6,718,178 B1 | 4/2004 | Sladek et al. |
| 6,728,361 B1 | 4/2004 | Ouyang |
| 6,731,741 B1 | 5/2004 | Fourcand et al. |
| 6,747,970 B1 | 6/2004 | Lamb et al. |
| 6,760,343 B1 | 7/2004 | Krishnamurthy et al. |
| 6,795,532 B1 | 9/2004 | Gross et al. |
| 6,801,781 B1 | 10/2004 | Provost et al. |
| 6,836,477 B1 | 12/2004 | West, Jr. et al. |
| 6,865,266 B1 | 3/2005 | Pershan |
| 6,917,612 B2 | 7/2005 | Foti et al. |
| 6,944,666 B2 | 9/2005 | Belkin |
| 6,963,583 B1 | 11/2005 | Foti |
| 6,967,956 B1 | 11/2005 | Tinsley et al. |
| 6,968,052 B2 | 11/2005 | Wullert, II |
| 7,010,114 B2 | 3/2006 | Stahl et al. |
| 7,058,036 B1 | 6/2006 | Yu et al. |
| 7,072,678 B2 | 7/2006 | Allison |
| 7,079,853 B2 | 7/2006 | Rathnasabapathy et al. |
| 7,181,194 B2 | 2/2007 | McCann et al. |
| 7,187,648 B1 | 3/2007 | Rangarajan et al. |
| 7,254,391 B2 | 8/2007 | McCann |
| 7,260,207 B2 | 8/2007 | Marsico |
| 7,333,809 B2 | 2/2008 | Engelhart |
| 7,394,818 B1 | 7/2008 | Johnson et al. |
| 7,864,752 B1 * | 1/2011 | Bennett et al. ................ 370/352 |
| 8,199,892 B2 | 6/2012 | Ravishankar et al. |
| 8,213,440 B2 | 7/2012 | Bantukul et al. |
| 8,606,222 B2 | 12/2013 | Agarwal et al. |
| 8,730,970 B2 | 5/2014 | Allison et al. |
| 2001/0030957 A1 | 10/2001 | McCann et al. |
| 2001/0031641 A1 | 10/2001 | Ung et al. |
| 2001/0034224 A1 | 10/2001 | McDowell et al. |
| 2001/0040957 A1 | 11/2001 | McCann et al. |
| 2001/0046234 A1 | 11/2001 | Agrawal et al. |
| 2001/0046856 A1 | 11/2001 | McCann |
| 2002/0023164 A1 | 2/2002 | Lahr |
| 2002/0027983 A1 | 3/2002 | Suzuki |
| 2002/0029189 A1 | 3/2002 | Titus et al. |
| 2002/0048360 A1 | 4/2002 | Zambre et al. |
| 2002/0054674 A1 | 5/2002 | Chang et al. |
| 2002/0058507 A1 | 5/2002 | Valentine et al. |

(56) References Cited

U.S. PATENT DOCUMENTS

| | | |
|---|---|---|
| 2002/0110104 A1 | 8/2002 | Surdila et al. |
| 2002/0111153 A1 | 8/2002 | Hartmaier et al. |
| 2002/0115441 A1 | 8/2002 | Alonso et al. |
| 2002/0126708 A1 | 9/2002 | Skog et al. |
| 2002/0136206 A1 | 9/2002 | Gallant et al. |
| 2002/0150079 A1 | 10/2002 | Zabawskyj et al. |
| 2002/0150221 A1 | 10/2002 | Carson et al. |
| 2002/0181673 A1 | 12/2002 | Henry et al. |
| 2002/0196775 A1 | 12/2002 | Tuohino et al. |
| 2003/0026289 A1 | 2/2003 | Mukherjee et al. |
| 2003/0027591 A1 | 2/2003 | Wall |
| 2003/0031160 A1 | 2/2003 | Gibson Ang et al. |
| 2003/0037108 A1 | 2/2003 | Peiffer et al. |
| 2003/0061234 A1 | 3/2003 | Ali et al. |
| 2003/0076941 A1 | 4/2003 | Tiliks et al. |
| 2003/0081754 A1 | 5/2003 | Esparza et al. |
| 2003/0091170 A1 | 5/2003 | McCann et al. |
| 2003/0129991 A1 | 7/2003 | Allison et al. |
| 2003/0131263 A1 | 7/2003 | Keane et al. |
| 2003/0177281 A1 | 9/2003 | McQuillan et al. |
| 2003/0199281 A1 | 10/2003 | Rathnasabapathy et al. |
| 2003/0203740 A1 | 10/2003 | Bahl et al. |
| 2003/0231623 A1* | 12/2003 | Ryu et al. ............ 370/352 |
| 2004/0003037 A1 | 1/2004 | Fukimoto et al. |
| 2004/0024894 A1 | 2/2004 | Osman et al. |
| 2004/0047341 A1 | 3/2004 | Staack et al. |
| 2004/0052240 A1 | 3/2004 | Stahl et al. |
| 2004/0091093 A1 | 5/2004 | Bookstaff |
| 2004/0095889 A1 | 5/2004 | Chang et al. |
| 2004/0106393 A1 | 6/2004 | Chowdhury et al. |
| 2004/0121761 A1 | 6/2004 | Tripathy et al. |
| 2004/0125757 A1 | 7/2004 | Mela et al. |
| 2004/0131052 A1 | 7/2004 | Smith et al. |
| 2004/0153506 A1 | 8/2004 | Ito et al. |
| 2004/0155757 A1 | 8/2004 | Litwin, Jr. et al. |
| 2004/0176086 A1 | 9/2004 | Chatterjee et al. |
| 2004/0184435 A1 | 9/2004 | Westman |
| 2004/0233840 A1 | 11/2004 | Bye |
| 2004/0240381 A1 | 12/2004 | Clark et al. |
| 2004/0264671 A1 | 12/2004 | Lamberton et al. |
| 2005/0027867 A1 | 2/2005 | Mueller et al. |
| 2005/0053213 A1 | 3/2005 | Giannoit |
| 2005/0053223 A1 | 3/2005 | Bedingfield |
| 2005/0070310 A1 | 3/2005 | Caspi et al. |
| 2005/0091157 A1 | 4/2005 | Suzuki et al. |
| 2005/0111632 A1 | 5/2005 | Caputo et al. |
| 2005/0201362 A1 | 9/2005 | Klein et al. |
| 2005/0202836 A1 | 9/2005 | Schaedler et al. |
| 2005/0213740 A1 | 9/2005 | Williams et al. |
| 2005/0220288 A1 | 10/2005 | Huey |
| 2005/0238048 A1 | 10/2005 | Delaney |
| 2005/0281399 A1 | 12/2005 | Moisey et al. |
| 2005/0286531 A1 | 12/2005 | Tuohino et al. |
| 2006/0025114 A1 | 2/2006 | Bales et al. |
| 2006/0029045 A1 | 2/2006 | Kobayashi et al. |
| 2006/0077965 A1 | 4/2006 | Garcia-Martin et al. |
| 2006/0079236 A1 | 4/2006 | Del Pino et al. |
| 2006/0105766 A1 | 5/2006 | Azada et al. |
| 2006/0136557 A1 | 6/2006 | Schaedler et al. |
| 2006/0177012 A1 | 8/2006 | Forney et al. |
| 2006/0209791 A1 | 9/2006 | Khadri et al. |
| 2006/0210027 A1 | 9/2006 | Kafri |
| 2006/0234744 A1 | 10/2006 | Sung et al. |
| 2006/0244744 A1 | 11/2006 | Kandori et al. |
| 2006/0291486 A1 | 12/2006 | Cai et al. |
| 2006/0291488 A1 | 12/2006 | Naqvi et al. |
| 2007/0094304 A1 | 4/2007 | Horner et al. |
| 2007/0121875 A1 | 5/2007 | Gruchala et al. |
| 2007/0121908 A1 | 5/2007 | Benedyk et al. |
| 2007/0127436 A1 | 6/2007 | Karimi-Cherkandi et al. |
| 2007/0133574 A1 | 6/2007 | Tejani et al. |
| 2007/0167166 A1 | 7/2007 | Fleischer, III et al. |
| 2007/0206747 A1 | 9/2007 | Gruchala et al. |
| 2007/0258575 A1 | 11/2007 | Douglas et al. |
| 2007/0275738 A1 | 11/2007 | Hewes et al. |
| 2008/0031196 A1 | 2/2008 | Marathe et al. |
| 2008/0080488 A1 | 4/2008 | Marsico |
| 2008/0139170 A1 | 6/2008 | Kahn |
| 2008/0160954 A1 | 7/2008 | Agarwal et al. |
| 2008/0198862 A1 | 8/2008 | Bantukul et al. |
| 2008/0198996 A1 | 8/2008 | Bantukul et al. |
| 2008/0205603 A1 | 8/2008 | Allison et al. |
| 2008/0215740 A1 | 9/2008 | Gruchala et al. |
| 2008/0253362 A1 | 10/2008 | Samarasinghe et al. |
| 2008/0285735 A1 | 11/2008 | Ravishankar et al. |
| 2008/0310613 A1 | 12/2008 | Fleischer, III et al. |
| 2009/0010217 A1 | 1/2009 | Belling |
| 2009/0017794 A1 | 1/2009 | Wilson |
| 2009/0041225 A1 | 2/2009 | Agarwal et al. |
| 2009/0047980 A1 | 2/2009 | Wilson |
| 2009/0111489 A1 | 4/2009 | Wilson |
| 2009/0227276 A1 | 9/2009 | Agarwal et al. |
| 2010/0040029 A1 | 2/2010 | Doppler et al. |
| 2010/0056100 A1 | 3/2010 | Elman et al. |
| 2010/0093307 A1 | 4/2010 | Hui et al. |
| 2010/0157986 A1 | 6/2010 | Rao et al. |
| 2010/0158201 A1 | 6/2010 | Vijay Marathe et al. |
| 2011/0216762 A1 | 9/2011 | Nas et al. |

FOREIGN PATENT DOCUMENTS

| | | |
|---|---|---|
| EP | 0 212 654 | 5/1987 |
| EP | 0 258 654 | 3/1988 |
| EP | 0 264 023 | 4/1988 |
| EP | 0 853 411 A2 | 7/1998 |
| EP | 1 100 279 A2 | 5/2001 |
| EP | 1 107 617 A | 6/2001 |
| EP | 1 443 740 A1 | 8/2004 |
| EP | 1 657 848 A1 | 5/2006 |
| EP | 1 705 885 A1 | 9/2006 |
| EP | 1 269 764 B1 | 7/2008 |
| EP | 1 169 845 B1 | 8/2011 |
| EP | 2 116 021 B1 | 2/2015 |
| GB | 2 379 135 A | 2/2003 |
| GB | 2 382 267 | 5/2003 |
| JP | 58-215164 | 12/1983 |
| JP | 62-200859 | 9/1987 |
| KR | 1020030025024 A | 3/2003 |
| KR | 10-2003-0066043 | 8/2003 |
| KR | 10-2006-0090378 | 8/2006 |
| KR | 10-2007-0093383 | 9/2007 |
| WO | WO 84/01073 | 3/1984 |
| WO | WO 86/03915 | 7/1986 |
| WO | WO 88/00419 | 1/1988 |
| WO | WO 97/11563 | 3/1997 |
| WO | WO 97/33441 | 9/1997 |
| WO | WO 97/37502 | 10/1997 |
| WO | WO 98/28885 | 7/1998 |
| WO | WO 99/13653 | 3/1999 |
| WO | WO 99/14910 | 3/1999 |
| WO | WO 99/51008 | 10/1999 |
| WO | WO 00/16583 | 3/2000 |
| WO | WO 00/19758 | 4/2000 |
| WO | WO 00/22543 | 4/2000 |
| WO | WO 00/22840 | 4/2000 |
| WO | WO 00/30369 | 5/2000 |
| WO | WO 00/31933 | 6/2000 |
| WO | WO 00/33519 | 6/2000 |
| WO | WO 00/35155 A1 | 6/2000 |
| WO | WO 00/56032 | 9/2000 |
| WO | WO 00/60839 | 10/2000 |
| WO | WO 01/06679 A1 | 1/2001 |
| WO | WO 01/20920 A1 | 3/2001 |
| WO | WO 01/22761 A1 | 3/2001 |
| WO | WO 01/56308 A2 | 8/2001 |
| WO | WO 01/63883 A2 | 8/2001 |
| WO | WO 01/72055 A2 | 9/2001 |
| WO | WO 02/07456 A1 | 1/2002 |
| WO | WO 02/39765 A1 | 5/2002 |
| WO | WO 02/052834 | 7/2002 |
| WO | WO 02/058417 A1 | 7/2002 |
| WO | WO 02/063849 A1 | 8/2002 |
| WO | WO 02/078381 A1 | 10/2002 |
| WO | WO 02/096147 A1 | 11/2002 |

(56) References Cited

FOREIGN PATENT DOCUMENTS

| WO | WO 03/001770 A2 | 1/2003 |
|---|---|---|
| WO | WO 03/017697 A1 | 2/2003 |
| WO | WO 03/039106 A2 | 5/2003 |
| WO | WO 2004/047459 A2 | 6/2004 |
| WO | WO 2004/084530 A1 | 9/2004 |
| WO | WO 2004/105405 A2 | 12/2004 |
| WO | WO 2005/033841 A2 | 4/2005 |
| WO | WO 2005/053203 A2 | 6/2005 |
| WO | WO 2005/083995 A1 | 9/2005 |
| WO | WO 2006/031678 A2 | 3/2006 |
| WO | WO 2006/058275 A2 | 6/2006 |
| WO | WO 2006/102339 A2 | 9/2006 |
| WO | WO 2007/141762 A1 | 12/2007 |
| WO | WO 2008/042205 A2 | 4/2008 |
| WO | WO 2008/057259 A2 | 5/2008 |
| WO | WO 2008/085432 A1 | 7/2008 |
| WO | WO 2008/103333 A1 | 8/2008 |
| WO | WO 2008/103334 A1 | 8/2008 |
| WO | WO 2008/103371 A1 | 8/2008 |
| WO | WO 2010/060087 A2 | 5/2010 |

OTHER PUBLICATIONS

Notice of Abandonment for U.S. Appl. No. 11/731,800 (Aug. 3, 2011).
Non-Final Official Action for U.S. Appl. No. 11/904,298 (Jul. 7, 2011).
Official Action for U.S. Appl. No. 11/106,057 (Oct. 27, 2010).
Notification of Transmittal of the International Search Report and the Written Opinion of the International Searching Authority, or the Declaration for International Application No. PCT/US2010/021374 (Aug. 19, 2010).
Final Official Action for U.S. Appl. No. 11/106,057 (Mar. 9, 2010).
Interview Summary for U.S. Appl. No. 11/106,057 (Feb. 25, 2010).
Official Action for U.S. Appl. No. 11/106,057 (Sep. 14, 2009).
Notification of European publication number and information on the application of Article 67(3) EPC for European Application No. 04819521.8 (Aug. 2, 2006).
Notification of Transmittal of the International Search Report and the Written Opinion of the International Searching Authority, or the Declaration for International Application No. PCT/US04/37389 (Jun. 22, 2005).
"ENUM Driving Convergence in the Internet Age," NeuStar (Publication Date Unknown).
Supplementary European Search Report for Application No. 04 81 9521 (Oct. 31, 2011).
Official Action for U.S. Appl. No. 11/731,800 (Jan. 18, 2011).
Final Official Action for U.S. Appl. No. 11/890,299 (Dec. 9, 2010).
Extended European Search Report for European Patent No. 2074809 (Nov. 2, 2010).
Invitation pursuant to Article 94(3) and Rule 71(1) EPC for European application No. 00919712.0 (Aug. 25, 2010).
Official Action for U.S. Appl. No. 11/890,299 (Apr. 15, 2010).
Final Official Action for U.S. Appl. No. 11/731,772 (Mar. 25, 2010).
European Search Report for European application No. 08153801.9 (Jan. 27, 2010).
Communication of European Publication No. and Information on the Application of Article 67(3) EPC for European U.S. Pat. No. 2116021 (Oct. 14, 2009).
Notice of Allowance and Fee(s) Due for U.S. Appl. No. 09/627,253 (Jul. 24, 2009).
Official Action for U.S. Appl. No. 11/731,772 (Jul. 14, 2009).
Communication of European publication number and information on the application of Article 67(3) EPC for European Patent No. 2074809 (Jun. 4, 2009).
Ex parte Quayle for U.S. Appl. No. 09/627,253 (May 7, 2009).
Communication regarding the expiry of the time limit within which notice of opposition may be filed for European Application No. 01920654.9 dated May 7, 2009.
Notice of Abandonment for U.S. Appl. No. 09/627,253 (Nov. 12, 2008).

Notification of Transmittal of the International Search Report and the Written Opinion of the International Searching Authority, or the Declaration for International Application No. PCT/US2008/002220 (Jul. 8, 2008).
Notification of Transmittal of the International Search Report and the Written Opinion of the International Searching Authority, or the Declaration for International Application No. PCT/US08/02150 (May 20, 2008).
Notification of Transmittal of the International Search Report and the Written Opinion of the International Searching Authority, or the Declaration for International Application No. PCT/US08/02147 (May 20, 2008).
Notification of Transmittal of the International Search Report and the Written Opinion of the International Searching Authority, or the Declaration for International Application No. PCT/US07/26232 (May 15, 2008).
Final Official Action for U.S. Appl. No. 09/627,253 (Apr. 4, 2008).
Communication pursuant to Article 94(3) EPC for European Application No. 02794890.0 (Mar. 18, 2008).
Notification of Transmittal of the International Search Report and the Written Opinion of the International Searching Authority, or the Declaration for International Application No. PCT/US07/20825 (Mar. 18, 2008).
"BICC Architecture and BICC Protocol Details," Tekelec, p. 28-41 (2008).
"BICC Signaling Router (BSR) Reference Architecture (WP005274)," Tekelec, p. 2-91 (2008).
European Search Report for European Application No. 02794890.0 (Dec. 19, 2007).
Official Action for U.S. Appl. No. 09/627,253 (Sep. 20, 2007).
Restriction/Election Requirement for U.S. Appl. No. 09/627,253 (Jun. 14, 2007).
Communication pursuant to Article 96(2) EPC corresponding to European application No. 01920654.9 dated May 2, 2007.
Notice of Panel Decision for U.S. Appl. No. 09/627,253 (Apr. 2, 2007).
"GPRS Tunneling Protocol (GTP)," Trillium, Continuous Computing, pp. 1-3 (Copyright 2007).
Notice of Allowance and Fee(s) Due for U.S. Appl. No. 10/218,402 (Aug. 25, 2006).
Official Action for U.S. Appl. No. 09/627,253 (Aug. 25, 2006).
"ENUM Use and Management for the Successful Deployment of ENUM-Enabled Services," Lucent Technologies (Jul. 2006).
"Telecommunications and Internet Converged Services and Protocols for Advanced Networking (TISPAN); Interworking Between Session Initiation Protocol (SIP) and Bearer Independent Call Control (BICC) Protocol or ISDN User Part (ISUP)," ETSI EN 383 001 V1.1.1 (Jun. 2006).
Jennings et al., "Session Initiation Protocol (SIP) URIs for Application such as Voicemail and Interactive Voice Response (IVR)," The Internet Society, RFC 4458 (Apr. 2006).
Notice of Allowance and Fee(s) Due for U.S. Appl. No. 10/718,292 (Feb. 16, 2006).
Advisory Action for U.S. Appl. No. 09/627,253 (Dec. 28, 2005).
Official Action for U.S. Appl. No. 10/218,402 (Dec. 7, 2005).
Final Official Action for U.S. Appl. No. 10/718,292 (Oct. 27, 2005).
"Gateway Control Protocol: Version 3," Series H: Audiovisual and Multimedia Systems; Infrastructure of Audiovisual Services—Communication Procedures, ITU-T H.248.1 (Sep. 2005).
Final Official Action for U.S. Appl. No. 09/627,253 (Jun. 2, 2005).
Official Action for U.S. Appl. No. 10/718,292 (May 13, 2005).
Notice of Allowance and Fee(s) Due for U.S. Appl. No. 09/618,807 (Feb. 25, 2005).
Restriction Requirement for U.S. Appl. No. 10/218,402 (Feb. 23, 2005).
"TeleSys Announces the Compatibility of Ericsson's Mobile Advantage Wireless Office and teleSys' MACH7-IP Gateway," TeleSys Software-Press releast, pp. 1-2 (Publication Date Unknown) (Downloaded from the Internet on Oct. 5, 2004).
Notice of Allowance and Fee(s) Due for U.S. Appl. No. 09/618,807 (Jul. 27, 2004).
Pai, "In-Building Wireless: The Next Generation," TelephonyOnline.com, pp. 1-4 (Jun. 30, 2004).

(56) References Cited

OTHER PUBLICATIONS

Official Action for U.S. Appl. No. 09/627,253 (May 19, 2004).
ETSI Guide, "Corporate Telecommunication Networks (CN); User Identification in a SIP/QSIG Environment," ETSI EG 202 303 V1.1.1, pp. 1-25 (Apr. 2004).
Faltstrom et al., "The E.164 to Uniform Resource Identifiers (URI) Dynamic Delegation Discovery System (DDDS) Application (ENUM)," RFC 3761, pp. 1-16 (Apr. 2004).
"Interworking Between Session Initiation Protocol (SIP) and Bearer Independent Call Control Protocol or ISDN User Part," ITU-T Q.1912.5, p. 1-101 (Mar. 2004).
Handa, "In Building Wireless: The Next Generation," TMCnet.com, pp. 1-7 (Feb. 12, 2004).
Restriction/Election Requirement for U.S. Appl. No. 09/627,253 (Jan. 9, 2004).
"Services and Protocols for Advanced Networks (SPAN); Bearer Independent Call Control (BICC) Capability Set 2 (CS2); Protocol Specification," ETSI EN 302 213 V1.1.2 (Jan. 2004).
"Telecommunications and Internet Protocol Harmonization Over Networks (TIPHON) Release 4; Technology Mapping; Implementation of TIPHON Architecture Using BICC," ETSI TS 102 228 V4.1.1 (Nov. 2003).
Official Action for U.S. Appl. No. 09/618,807 (Oct. 22, 2003).
Fitchard, "A New Voice in the Boardroom," Wireless Review, pp. 1-3 (Sep. 1, 2003).
Supplemental Notice of Allowability for U.S. Appl. No. 09/503,541 (Aug. 5, 2003).
Camarillo et al., "Mapping of Integrated Services Digital Network (ISDN) User Part (ISUP) Overlap Signalling to the Session Initiation Protocol (SIP)," Network Working Group, RFC 3578 (Aug. 2003).
Supplemental Notice of Allowability for U.S. Appl. No. 09/503,541 (May 1, 2003).
Official Action for U.S. Appl. No. 09/627,253 (Apr. 28, 2003).
Notice of Allowance and Fee(s) Due for U.S. Appl. No. 09/503,541 (Apr. 16, 2003).
Restriction Requirement for U.S. Appl. No. 09/618,807 (Apr. 15, 2003).
Official Action for U.S. Appl. No. 09/503,541 (Mar. 11, 2003).
Interview Summary for U.S. Appl. No. 09/627,253 (Jan. 30, 2003).
Notification of Transmittal of the International Search Report or the Declaration for International Application No. PCT/US02/25789 (Dec. 10, 2002).
"Series Q: Switching and Signalling; Broadband ISDN—Signalling ATM Adaptation Layer (SAAL); Signalling Transport converter on SCTP," ITU-T Q.2150.3 (Dec. 2002).
"Bearer Independent Call Bearer Control Protocol," ITU-T Q.1950, p. 1-96 (Dec. 2002).
Campbell et al., "Session Initiation Protocol (SIP) Extension for Instant Messaging," pp. 1-15 (Dec. 2002).
Camarillo et al., "Integrated Services Digital Network (ISDN) User Part (ISUP) to Session Initiation Protocol (SIP) Mapping," Network Working Group, RFC 3398 (Dec. 2002).
Vemuri et al., "Session Initiation Protocol for Telephones (SIP-T): Context and Architectures," Network Working Group, RFC 3372 (Sep. 2002).
"3$^{rd}$ Generation Partnership Project; Technical Specification Group Services and Systems Aspects; Network Architecture (Release 5)," 3GPP TS 23.002, V5.7.0, p. 1-50, (Jun. 2002).
"Fixed Wireless Technology," ISP Planet, pp. 1-4 (May 14, 2002).
Chang, "BICC Extension of SIP in Inter-Network Configuration," Internet Engineering Task Force, draft-chang-sipping-bicc-network-00.txt, pp. 1-17 (Mar. 2002).
Multiservice Switching Forum, "Implementation Agreement for BICC," MSF-IA-BICC.001-FINAL (Feb. 2002).
Notice of Allowance and Fee Due for U.S. Appl. No. 09/537,075 (Aug. 14, 2001).
Marshall et al., "SIP Extensions for Supporting Distributed Call State," SIP Working Group, Internet Draft, pp. 1-12 (Aug. 2001).
Final Official Action for U.S. Appl. No. 09/537,075 (Jul. 25, 2001).
Martinek, "Office on the Fly," Wireless Review, pp. 1-4 (Jul. 15, 2001).
"March Networks 3300 Integrated Communications Platform," Mitel Networks Corporation, pp. 1-34 (Jul. 2001).
"Series Q: Switching and Signalling; Specification of Signalling Related to Bearer Independent Call Control (BICC); Bearer Independent Call Control Protocol (Capability Set 2): Basic Call Procedures," ITU-T Q.1902.4 (Jul. 2001).
"Bearer Independent Call Control Protocol (Capability Set 2) and Signalling System No. 7 ISDN User Part: Formats and Codes," ITU-T Q.1902.3, p. 1-141 (Jul. 2001).
"Bearer Independent Call Control Protocol (Capability Set 2) and Signaling System No. 7 ISDN user part: General Functions of Messages and Parameters," ITU-T Q.1902.2 (Jul. 2001).
"Bearer Independent Call Control Protocol (Capability Set 2): Functional Description," ITU-T Q.1902.1, p. 1-23 (Jul. 2001).
"Description of the SMS Prepaid Relay Function Implemented in the SRF Equipment," Edition 0.1, unpublished, dated Jul. 2001.
"Series Q: Switching and Signalling, Specification of Signalling Related to Bearer Independent Call Control (BICC); BICC Bearer Control Tunnelling Protocol," ITU-T Q.1990 (Jul. 2001).
"Series Q: Switching and Signalling; Specifications of Signalling System No. 7—ISDN User Part; Signalling System No. 7—Application Transport Mechanism: Bearer Independent Call Control (BICC); Amendment 1: Bearer Independent Call Control Capability Set 2," ITU-T Q.765.5 (Jul. 2001).
"Series Q: Switching and Signalling; Specifications of Signalling Related to Bearer Independent Call Control (BICC): Interworking Between Signalling System No. 7 ISDN User Part and the Bearer Independent Call Control Protocol," ITU-T Q.1912.1 (Jul. 2001).
"Series Q: Switching and Signalling; Interworking Between Selected Signalling Systems (PSTN Access, DSS1, C5, R1, R2, TUP) and the Bearer Independent Call Control Protocol," ITU-T Q.1912.2 (Jul. 2001).
"Signalling Transport Converter on MTP3 and MTP3b," ITU-T Q.2150.1 (May 2001).
"Generic Signalling Transport Service," ITU-T Q.2150.0 (May 2001).
Official Action for U.S. Appl. No. 09/537,075 (Jan. 3, 2001).
"ITU-Q1970: Draft New ITU-T Recommendation Q.1970 BICC IP Bearer Control Protocol," Network Dictionary (2001).
"Gateway Control Protocol: Transport Over Stream Control Transmission Protocol (SCTP)," Series H: Audiovisual and Multimedia Systems; Infrastructure of Audiovisual Services—Communication Procedures, H.248.4 (Nov. 2000).
"Digital Cellular Telecommunications System (Phase 2+); General Packet Radio Service (GPRS); GPRS Tunnelling Protocol (GTP) Across the Gn and Gp Interface (3GPP TS 09.60 version 7.6.0 Release 1998)", ETSI TS 101 347, pp. 1-67 (Sep. 2000).
Stewart et al., "Stream Control Transmission Protocol," Internet draft, draft-ietf-sigtran-sctp-10.txt (Jun. 16, 2000).
Swartz, "Ready, Set, Wiireless Office!" Wireless Review, pp. 1-4 (Jun. 1, 2000).
"Bearer Independent Call Control Protocol," ITU-T Q.1901 (Jun. 2000).
"Telstra and Ericsson Trial Next Generation Wireless Office Solution," Ericsson, pp. 1-2 (Apr. 28, 2000).
"Mitel and Ericsson Join Forces to Deliver an Integrated Digital Wireless Office Solution with PBX Functionality-Company Business and Marketing," Cambridge Telecom Report, pp. 1-4 (Apr. 24, 2000).
"Market and Development Agreement Targets Customers Looking for Ways to Become More Productive Through Convenient and Cost-Effective Communication," Ericsson Press Release, pp. 1-2 (Apr. 4, 2000).
Sugano et al., "Presence Information Data Format for IMPP," Internet draft, draft-ieff-impp-pidf-01.text, Network Working Group, pp. 1-17 (Mar. 10, 2000).
Aggarwal et al., "Transport Protocol for Presence Information/Instant Messaging," Internet draft, draft-ietf-impp-pitp-mitp-01, Network Working Group, p. 1-21, (Mar. 9, 2000).
Day et al., "A Model for Presence and Instant Messaging," Request for Comments: 2778, Network Working Group, p. 1-17, (Feb. 2000).

(56) References Cited

OTHER PUBLICATIONS

Day et al., "Instant Messaging/Presence Protocol Requirements," Request for Comments: 2779, Network Working Group, p. 1-26, (Feb. 2000).
Sulkin, "Emerging Options for Wireless PBXs," Voice2000, pp. 1-8 (Feb. 2000).
Stracke, J., "Message Information Data Format," Internet draft, draft-ietf-impp-midf-01.txt, Network Working Group, p. 1-4, (Jan. 19, 2000).
Drzewianowski, "WLANs—For the Picking," Communications Solutions™ Next-Gen Networks, pp. 1-9 (Jan. 2000).
"The Wireless Business Connection," Second Quarter 2000 report, The Phillips Group—Infortech, pp. 1-9 (2000).
"Signalling System No. 7—ISDN User Part Enhancements for the Support of Number Portability," ITU-T Q.769.1 (Dec. 1999).
"Signalling System No. 7—ISDN User Part Formats and Codes," ITU-T Q.763 (Dec. 1999).
"Signalling System No. 7—ISDN User Part General Functions of Messages and Signals," ITU-T Q.762 (Dec. 1999).
"Signalling System No. 7—ISDN User Part Functional Description," ITU-T Q.761 (Dec. 1999).
"Series Q: Switching and Signalling; Specifications of Signalling System No. 7—ISDN Supplementary Services; ISDN User Part Supplementary Services," ITU-T Q.730 (Dec. 1999).
"Ericsson Announces General Availability of Its Mobile Advantage Wireless Office System," Ericsson Press Release, pp. 1-2 (Nov. 4, 1999).
Tekelec, "IP7 Secure Gateway Release 1.0", Tekelec Release Documentation, 910-2046-01 Revision A (Nov. 1999).
O'Shea, "Mating Season," Telephony, pp. 10-11 (Sep. 20, 1999).
"Corporate Offices to go Wireless First Australian GSM on the Net Trial," Ericsson Press Release, pp. 1-3 (Aug. 11, 1999).
Anonymous, "Operations, Maintenance and Administration Part," International Telecommunications Union, p. 485-531 (Jul. 27, 1999).
General Signal Networks, "SS7 Performance Management System," www.gsnetworks.com/powerof7/index.html (Downloaded Jul. 18, 1999).
Danar Corporation, "About Syzgy," (Downloaded Jul. 14, 1999).
HomiscoNoicenet Inc., "Features," www.homisco.com/SS7/page7.html (Downloaded Jul. 14, 1999).
3GPP, "3$^{rd}$ Generation Partnership Project; Universal Mobile Telecommunications System; Mobile Radio Interface Layer 3 Specification, Core Network Protocols—Stage 3," TS 24.008 V3.0.0 (Jul. 1999).
"Ericsson Solution Chosen for World's First Combined DECT/GSM Communications Service," Ericsson, pp. 1-9 (Jun. 21, 1999).
Waveteck Wandel Goltermann, "8620 SS7 Signaling Surveillance System," Switching Test Solutions AG (Jun. 15, 1999).
Hamdi et al., "Voice Service Interworking for PSTN and IP Networks," IEEE Communications Magazine, pp. 104-111 (May 8, 1999).
Lakshmi-Ratan, "The Lucent Technologies Softswitch—Realizing the Promise of Convergence," Bell Labs Technical Journal, pp. 174-195 (Apr.-Jun. 1999).
Dunn, "Triggerless LNP," Tekelec Eagle, p. 1-42 (Mar. 31, 1999).
Vittore, "Enhanced Offerings Shoot for Easy," Telephony, p. 48, 50 & 51 (Mar. 8, 1999).
Hanley, "Fight for the Future: Test Vendors Try to Get the Edge on Unstandardized Technology with Flexible, Forward-Thinking Products," Telephony, p. 52-54 (Mar. 8, 1999).
Handley et al., "SIP: Session Initiation Protocol," Request for Comments: 2543, Network Working Group, p. 1-111, (Mar. 1999).
Liao et al., "SS7-TCAP/IP Interworking," Internet Engineering Task Force, pp. 1-14 (Mar. 1999).
"Enterprise IP Gateway," Ericsson, pp. 1-6 (1999).
"The Ericsson IPT System," Ericsson, pp. 1-8 (1999).
Johanson et al., "Mobile Advantage Wireless Office—A Digital Wireless Office System for TDMA/136 Networks," Ericsson review No. 1, pp. 20-27 (1999).
Lin et al., "Number Portability for Telecommunication Networks," IEEE, p. 56-62 (1999).
"PCS Access Network Requirements: Product Specification for Network Element: Gateway Signaling Transfer Point Between CCS/SS7 & TCP-IP Networks (GW-STP-IP)", pp. 1-20 (Dec. 3, 1998).
"PCS Access Network Requirements: Interface Specification; Interface: Service Access Socket System Interface (SASSI)," Version 01.01, pp. 1-42 (Dec. 3, 1998).
"Wireless: Top Ericsson Executives Lay Out Corporate Vision, Unveil Strategy for the Enterprise Customer—Company Business and Marketing," EDGE, On & About AT&T, pp. 1-5 (Nov. 30, 1998).
Rosenberg et al., "SIP for Presence," IETF, draft-rosenberg-sip-pip-00.txt, p. 1-22 (Nov. 13, 1998).
Levine, "Pancaking Portability," America's Network, p. 55-56 (Oct. 1, 1998).
Data Gulper, "Load Your Data Warehouse 10 Times Faster. Concurrently Load up to 500+ Online Feeds. Filter Out Useful Data and Store it Quickly," Compendium Research Corporation (May 2, 1998).
"Ericsson Wireless Office Services to Provide Digital System Through AT&T Wireless Services," Ericsson Press Release, pp. 1-2 (Apr. 17, 1998).
Handley et al., "SDP: Session Description Protocol," Request for Comments: 2327, Network Working Group, p. 1-42, (Apr. 1998).
TEKELEC, "Feature Guide Eagle STP," P/N 910-1225-01 Revision B (Jan. 1998).
TEKELEC, "Feature Guide LNP LSMS," P/N 910-1598-01 Revision A (Jan. 1998).
Chen, "Local Number Portability: Operations Impact and Architecture," BellSouth Telecommunications, p. 973-981 (1998).
McGrew, "Transport SS7 Signalling Over IP," Lucent Technologies Inc., p. 1-8 (1998).
O'Shea, "The Network That's Never Done," Telephony, p. 39, 40, 42 & 43 (Sep. 15, 1997).
DSC Communications, "DSC Signs Agreements with unisys for Intelligent Network Measurement and Monitoring Systems," Press Release (Jul. 15, 1997).
O'Shea, "The Great Seeping Software Takeover," Telephony, p. 32, 36, 38, & 42 (Jun. 30, 1997).
Tekelec, "Eagle STP: STP-LAN Interface Feature," (May 2, 1997).
Anonymous, "Alliances," Communications Week, p. 14-15 (Apr. 7, 1997).
Engebretson, "Much Ado About Numbers," Telephony, p. 22-24, 26, & 28 (Apr. 7, 1997).
Bellcore, "NetPilot™-STP Interface for Administration of STP-Based Local Number Portability (LNP) Translations," Bellcore Communications Research, SR-4251, Issue 1, p. 1-239 (Mar. 1997).
Smith, "Number Portability Pileup," Telephony, p. 22, 24, & 26 (Jan. 6, 1997).
Rice, Patt, "Local Number Portability," Phone + Magazine, p. 1-2 (1997).
Tekelec, "Eagle (Registered) STP Platform," 908-0126-01 (1997).
Tekelec, "Eagle STP Database Transport Access Feature," 908-0136-01 (1997).
Tekelec, "Eagle STP X.25 to SS7-IS.41 Protocol Conversion Feature," 908-0135-01 (1997).
Tekelec, "Eagle STP ANSI-ITU gateway Feature," 908-0133-01 (1997).
Tekelec, "SS7-Frame Relay Access Device SS7 Protocol Information Translator," 908-0167-01 (1997).
Snyder, "Testing Portability Possibilities," Telephony, p. 70 (Nov. 18, 1996).
Synder, "Rerouting Internet Traffic Jams," telephony, p. 12 (Nov. 11, 1996).
Snyder, "Branded With Optics," Telephony, pp. 49-50 (Jul. 22, 1996).
Anonymous, "Around the Loop," Telephony, p. 26 (Jul. 22, 1996).
Anonymous, "Generic Switching and Signaling Requirements for Number Portability," AT&T Network Systems, Issue 1, p. 1-75 (Feb. 2, 1996).
Interface Recommendation for Intelligent Network CS-1, ITU-T Q.1218 (Oct. 1995).
Hewlett Packard, "HP acceSS7 Signaling Monitoring System," Hewlett Packard Co. (May 2, 1995).

(56) References Cited

OTHER PUBLICATIONS

Woods, "Fresno Bee Still Buzzing About Wireless," TechNews, pp. 1-2 (1995).
Tekelec, "Proposal for MCI Billing System," (Nov. 2, 1993).
Tekelec, "Common Channel Signaling System 7 Link Monitoring," Response to Request for Proposal from Southwestern Bell Telephone (Jul. 2, 1993).
Blake, "Fast, Smart and in Cotnrol Signaling System 7 is Helping Bring the Intelligent Network to the End User," In Perspective, p. 20-23 (May 2, 1993).
Bellcore, "Generic Requirements for Common Channel Signaling (CCS) Network Usage Measurement Functionality," Technical Advisory, p. 1-76 (Dec. 2, 1992).
Kritzmacher et al., "Recommendations for SS7 Reliability," TE&M, p. 35, 36, & 38 (Nov. 1, 1992).
Bellcore, "Request for Industry Input: Extending a Signal Transfer Point Adjunct Beyond Usage/Billing Measurements," Digest, p. 33 (Jun. 2, 1992).
Tekelec, "IDS Enhanced Gateway Billing Ssytem User's Manual,", (Jan. 22, 1992).
Federal Communications Commission, "Notice of Inquiry," Federal Communications Commission (Dec. 6, 1991).
Hester, "Can You Afford to be Without SS7 Network Surveillance," Telephony (Dec. 3, 1990).
Lanning, "SS7 Interconnection Awaits Green Light," Telephony's Tranmission Special, p. 32 & 34 (Nov. 2, 1990).
Telcordia Technologies, "A Framework of High-Level Requirements and Considerations for Common Channel Signaling Network Usage Measurements to Support Billing and Bill Verification," Framework Technical Advisory, p. 1-40, A-1-R-4 (Jan. 2, 1990).
Zaharychuk et al., "ICC/SUPERCOM '90," IEEE, p. 223, 2.1-223.2.8 (1990).
Buckles, "SS7 Gateways Serve and Protect," Telephony, p. 39-41 & 44 (Nov. 20, 1989).
Rusin, "Voice Processing and the Intelligent Network," TE&M, p. 51-68 (Mar. 1, 1989).
Anonymous, "An Independent Future," Rural Telecommunications (1989).
Anonymous, "A New Network," TE&M (Dec. 1, 1988).
Marshall, "Maintaining the CCS Network," TE&M, p. 78-80 (Nov. 1, 1988).
Strusser, "Call Accounting Needs Five New Features," Business Communication Review, p. 45-48 (Sep. 28, 1988).
Anonymous, "Independent SS7 Network Questions and Answers," (Aug. 2, 1988).
Parsons, "Update: Financial Considerations and Network Control Most Important for Independent Telcos Examining SS7," p. 1-4 (Aug. 2, 1988).
Hilton et al., "Common Channel Signaling for Independents," TE&M (Jun. 15, 1988).
Anonymous, "Independent SS7 Network SSP Solutions," (May 2, 1988).
Parsons, "A800: A Decision to Remain Independent," p. 1-4 (May 2, 1988).
Bootman et al., "Intelligent Network Services Using a Service Switching Node," IEEE, pp. 40.7.1-40.7.4 (1988).
Bootman et al., "Generic Blocks for the Telecommunications Management Network," IEEE, pp. 6.1.1-6.1.5 (1988).
Buckles, "Very High Capacity Signaling Transfer Point for Intelligent Network Services," IEEE, p. 40.2.1-40.2.4 (1988).
Faletti et al., "Signaling System #7: The Corporate Network Backbone," IEEE Global Telecommunications Conference, Hollywood, Florida, p. 10.2.1-10.2.9 (1988).
Anonymous, "American National Standard for Telecommunications—Monitoring and Measurements for Signaling System 7 Networks," (1988).
Rose, "Understanding the Intelligent Network," OPASTCO Roundtable (1988).
Titch, "The Pipe and the Protocol," Closeup Supplement to Communications Magazine (1988).

Protocol Technologies, "#7 MGTS Monitor Trap Overview," MGTS User's Guide, p. 5.9.0-5.9.36 (Dec. 2, 1987).
Protocol Technologies, "Protocol Technologies User's Guide: Message Generator/Traffic Simulator," p. 1-1-8-2 (Apr. 2, 1987).
Chow et al., "CCITT Signaling System No. 7: The Backbone for Intelligent Network Services," Globecom, p. 40.1.1-40.1.5 (1987).
Worrall, "Vitural Network Capabilities—The Next Phase of the 'Intelligent Network'," Globecom (1987).
Anonymous, "Automatic Message Accounting Teleprocessing System (AMATPS) Generic Requirements," Telcordia Technologies, Inc. (Abstract Only) (Sep. 2, 1986).
Anonymous, "Systems Engineering Requirements for the 1ESS Switch Automatic Message Account Trasmitter (AMAT)," Telcordia Technologies, Inc. (Abstract Only) (Nov. 2, 1985).
Szybicki, "Adaptive, Tariff Dependent Traffic Routing and Network Management in Multi-Service Telecommunications Networks," Elsevier Science Publisher B.V., p. 614-621 (Sep. 4-11, 1985).
Hayward, "Traffic Engineering in a New Competitive Environment," Elsevier Science Publishers B.V., p. 1112-1116 (May 24, 1985).
Wang et al., "Database Administration System—Architecture and Design Issues," The Bell System Technical Journal, p. 2438-2458 (Nov. 24, 1982).
Anonymous, "The ABC's of LNP," Supplement to America's Network, p. S3-S4 (Publication Date Unknown).
Anonymous, "Billing Usage Measurements/Automatic Message Accounting," Telcordia Technologies, Inc. Project Abstacts (Publication Date Unknown).
Anonymous, "Isn't it Ironic . . . ," Supplement to America's Network, p. S5-S7 (Publication Date Unknown).
Anonymous, "The Sterling Data Server Family: The Advanced Intelligent Network Billing Mediation Platform," Telesciences (Publication Date Unknown).
De Ment, "The Evolution of Signaling," NMS Communications, p. 1-28 (Publication Date Unknown).
"Mobile Wireless Overview," Cisco IOS Mobile Wireless Configuration Guide, pp. MWC-1-MWC-8 (Publication Date Unknown).
Sette, "Intermediate Signaling Network Identification," Bellcore, p. 1-10 (Publication Date Unknown).
Sette, "Intermediate Signaling Network Identification," (Publication Date Unknown).
Decision of Rejection for Chinese Patent Application No. 200880012885.X (May 6, 2013).
First Office Action for Chinese Patent Application No. 200780051876.7 (Mar. 7, 2012).
Notification of Transmittal of the International Search Report and the Written Opinion of the International Searching Authority, or the Declaration for International Application No. PCT/US2009/065745 (Jun. 15, 2010).
"3rd Generation Partnership Project; Technical Specification Group Core Network and Terminals; IP Multimedia Call Control Protocol Based on Session Initiation Protocol (SIP) and Session Description Protocol (SDP); Stage 3 (Release 5)," 3GPP TS 24.229 V5.22.0 (Sep. 2008).
Garcia-Martin et al., "Private Header (P-Header) Extensions to the Session Initiation Protocol (SIP) for the 3rd-Generation Partnership Project (3GPP)," Network Working Group, RFC 3455 (Jan. 2003).
Young-Fu Chang, "BICC Extension of SIP in Inter-Network Configuration," Lucent Technologies draft-chang-sipping-bicc-network-00.txt (Sep. 2001).
Non-Final Official Action for U.S. Appl. No. 13/044,510 (Oct. 31, 2012).
Final Official Action for U.S. Appl. No. 12/625,017 (Oct. 24, 2012).
Noting of loss of rights pursuant to Rule 112(1) EPC for European Application No. 08725747.3 (Aug. 28, 2012).
Non-Final Official Action for U.S. Appl. No. 12/625,017 (Apr. 11, 2012).
Final Official Action for U.S. Appl. No. 11/891,677 (Apr. 6, 2012).
Notice of Allowance and Fee(s) Due for U.S. Appl. No. 11/731,772 (Mar. 15, 2012).
Examiner-Initiated Interview Summary for U.S. Appl. No. 11/731,772 (Feb. 24, 2012).
First Office Action for Chinese Patent Application No. 200880012488.2 (Feb. 15, 2012).

(56) References Cited

OTHER PUBLICATIONS

Notice of Abandonment for U.S. Appl. No. 11/904,298 (Feb. 2, 2012).
First Office Action for Chinese Patent Application No. 200880012885.X (Jan. 11, 2012).
Extended European Search Report for European Application No. 08725747.3 (Dec. 23, 2011).
Non-Final Official Action for U.S. Appl. No. 11/891,677 (Dec. 6, 2011).
Second Office Action for Chinese Application No. 200880012488.2 (Dec. 28, 2012).
Notice of Allowance and Fee(s) Due for U.S. Appl. No. 11/890,299 (Mar. 26, 2013).
Second Office Action for Chinese Application No. 200880012885.X (Sep. 27, 2012).
Non-Final Office Action for U.S. Appl. No. 11/891,677 (Feb. 19, 2013).
Second Office Action for Chinese Patent Application No. 200780051876.7 (Dec. 5, 2012).
Decision of Rejection for Chinese Patent Application No. 200780048418.8 (Jul. 4, 2012).
Second Office Action for Chinese Patent Application No. 200780048418.8 (Mar. 23, 2012).
Supplemental Notice of Allowability for U.S. Appl. No. 11/977,723 (Feb. 23, 2012).
Notice of Allowance and Fee(s) Due for U.S. Appl. No. 11/977,723 (Jan. 18, 2012).
Final Official Action for U.S. Appl. No. 11/977,723 (Sep. 29, 2011).
First Office Action for Chinese Patent Application No. 200780048418.8 (Jun. 15, 2011).
Official Action for U.S. Appl. No. 11/977,723 (Feb. 17, 2011).
Communication of European publication number and information on the application of Article 67(3) EPC for European Patent No. 2084861 (Jul. 8, 2009).
Notification of Transmittal of the International Search Report and the Written Opinion of the International Searchig Authority, or the Declaration for International Application No. PCT/US07/22664 (Mar. 14, 2008).
Roach, "Session Initiation Protocol (SIP)—Specific Event Notification," Network Working Group, RFC 3265 (Jun. 2002).
Final Office Action for U.S. Appl. No. 11/891,677 (Oct. 7, 2013).
Extended European Search Report for European Application No. 08725814.1 (Sep. 23, 2013).
Notice of Allowance and Fee(s) Due for U.S. Appl. No. 11/890,299 (Aug. 6, 2013).
Final Office Action for U.S. Appl. No. 13/044,510 (Jul. 5, 2013).
Extended European Search Report for European Application No. 08725750.7 (Jul. 8, 2013).
Notice of Granting Patent Right for Invention for Chinese Patent Application No. 200780051876.7 (Jun. 26, 2013).
Extended European Search Report for European Application No. 07839798.1 (Jun. 19, 2013).
Extended European Search Report for European Application No. 07867984.2 (Jun. 18, 2013).
Non-Final Office Action for U.S. Appl. No. 12/625,017 (Dec. 22, 2014).
First Examination Report for Indian Patent Application No. 4447/CHENP/2009 (Nov. 24, 2014).
Communication under Rule 71(3) EPC for European Patent Application No. 07 867 984.2 (Oct. 22, 2014).
First Examination Report for Indian Patent Application No. 5612/CHENP/2009 (Oct. 10, 2014).
First Examination Report for Indian Patent Application No. 5562/CHENP/2009 (Sep. 17, 2014).
Notification of Reexamination for Chinese Application No. 200780048418.8 (Jul. 23, 2014).
First Examination Report for Indian Patent Application No. 2935/CHENP/2009 (Jun. 23, 2014).
First Examination Report for Indian Application No. 2112/CHENP/2009 (Jun. 6, 2014).
Notice of Allowance and Fee(s) Due for U.S. Appl. No. 11/891,677 (Dec. 31, 2013).
Applicant-Initiated Interview Summary for U.S. Appl. No. 13/044,510 (Nov. 21, 2013).
Advisory Action for U.S. Appl. No. 13/044,510 (Oct. 24, 2013).
Notice of Granting Patent Right for Invention for Chinese Application No. 200880012488.2 (Jul. 15, 2013).
Rejection Decision for Chinese Patent Application No. 200780048418.8 (Mar. 31, 2015).
Notification of Reexamination for Chinese Patent Application No. 200880012885.X (Mar. 11, 2015).
Reexamination Decision for Chinese Application No. 200880012885.X (Jun. 26, 2015).
Non-Final Office Action for U.S. Appl. No. 13/044,510 (Jun. 18, 2015).
First Examination Report for Indian Patent Application No. 5563/CHENP/2009 (Apr. 24, 2015).

* cited by examiner

METHODS, SYSTEMS, AND COMPUTER READABLE MEDIA FOR CENTRALIZED ROUTING AND CALL INSTANCE CODE MANAGEMENT FOR BEARER INDEPENDENT CALL CONTROL (BICC) SIGNALING MESSAGES

PRIORITY CLAIM

This application claims the benefit of U.S. Provisional Patent Application Ser. No. 61/145,517, filed Jan. 16, 2009; the disclosure of which is incorporated herein by reference in its entirety.

TECHNICAL FIELD

The subject matter described herein relates to the bearer independent call control protocol. More particularly, the subject matter described herein relates to methods, systems, and computer readable media for centralized routing and call instance code management for BICC signaling messages.

BACKGROUND

The bearer independent call control (BICC) protocol is a signaling protocol based on narrowband-ISDN user part (N-ISUP) that is used to support narrowband integrated services digital network (ISDN) service over a broadband backbone network. Specified by the International Telecommunications Union-Telecommunications Standardization Sector (ITU-T) in recommendations Q.1901 and Q.1902, BICC supports narrowband ISDN services independently of bearer and signaling message transport technology. The BICC architecture also separates the call control function from the bearer control function.

As specified by the ITU-T, a BICC-capable signaling point (SP) is statically provisioned with a routing table which associates, among other things, a range of call instance code or CIC values with each BICC SP in the mesh. These ranges are mutually agreed upon between the BICC SPs. ISUP uses the same acronym, CIC, for "circuit identification code" which identifies the circuit being used for end user communications. The circuit identifier code and the call instance code are each used by their respective protocol for the identification of a signaling relation between peer entities and the association of signaling messages to that relation. Unlike the circuit identification code in ISUP, the call instance code in BICC is not specified in the BICC standards documents as identifying a physical circuit. However, the call instance code in BICC can also be used to identify a physical circuit or bearer connection without departing from the scope of the subject matter described herein. The acronym, CIC, as used hereinafter, is intended to refer to the call instance code.

Prior to initiating a call, an originating BICC SP must select a destination BICC SP and an associated call instance code that is based, at least in part, on the called party's dialed digits. The originating BICC SP then sends a message to the destination BICC SP using the call instance code.

The ITU-T specifications also provide an element called a call mediation node (CMN). As specified, a CNM hosts a coordinating call service function (CSF-C) but lacks a bearer control function (BCF). A CSF-C communicates with all other types of CSFs (e.g., coordinating, gateway, nodal, transit). According to ITU-T Q.1202.4, when the CMN receives a signaling message, the CMN selects a free call instance code and sends the message to the next CSF. Q.1202.4 does not specify how the originating node selects the original call instance code to be included in the IAM message or steps to be performed by the CMN that are part of the same signaling session.

One problem not addressed in the BICC specifications is how a CMN interacts with the BICC-capable SPs within a mesh topology. As mentioned, the BICC SPs must bilaterally agree on the call instance code ranges used between them. If a CMN is present then this creates an additional barrier to communication. For example, if a BICC SP 1 sends a call setup message, it must first select an available call instance code associated with the destination BICC SP. If a CMN is in the middle of the mesh, BICC SP 1 does not know in advance which SP will receive the message, since when the CMN receives a message it performs a routing function that is unknown to the message originator. Therefore, BICC SP 1 cannot choose an appropriate call instance code to use. Furthermore, with full-mesh topology, each time a new BICC SP is added to the mesh, the routing tables of all BICC SPs and CMNs in the network must be updated or re-provisioned.

Another problem not addressed is congestion and unbalanced loads among BICC SPs. Since an originating BICC SP is unaware of the loading status of the selected destination or next-hop BICC SP, the originating BICC SP may be sending messages to a congested BICC SP when a less congested BICC SP is available, thereby exacerbating the congestion and decreasing throughput and efficiency of the network.

Thus, there exists a long felt need for methods, systems, and computer readable media for centralized routing and call instance code management that avoids at least some of the difficulties not addressed by the BICC specifications.

SUMMARY

The subject matter described herein includes methods, systems and computer readable media for centralized routing and call instance code management for bearer independent call control (BICC) signaling messages. One aspect of the subject matter described herein includes a system for routing BICC signaling messages and managing call instance code assignments. The system includes a BICC signaling router. The BICC signaling router includes a routing module for centralized routing of BICC signaling messages between a plurality of BICC signaling nodes. The BICC signaling router further includes a call instance code management module for centralized assignment of call instance codes for BICC signaling sessions routed through the BICC signaling router.

The subject matter described herein for centralized routing and call instant code management for BICC signaling messages can be implemented using a non-transitory computer readable medium having stored thereon computer executable instructions that when executed by the processor of a computer perform steps. Exemplary non-transitory computer readable media suitable for implementing the subject matter described herein include chip memory devices, disk memory devices, programmable logic devices, and application specific integration circuits. In addition, a computer readable medium that implements the subject matter described herein may be located on a single device or computing platform or may be distributed across plural devices or computing platforms.

BRIEF DESCRIPTION OF THE DRAWINGS

Preferred embodiments of the subject matter described herein will now be explained with reference to the accompanying drawings, of which.

DETAILED DESCRIPTION

Figure 1:
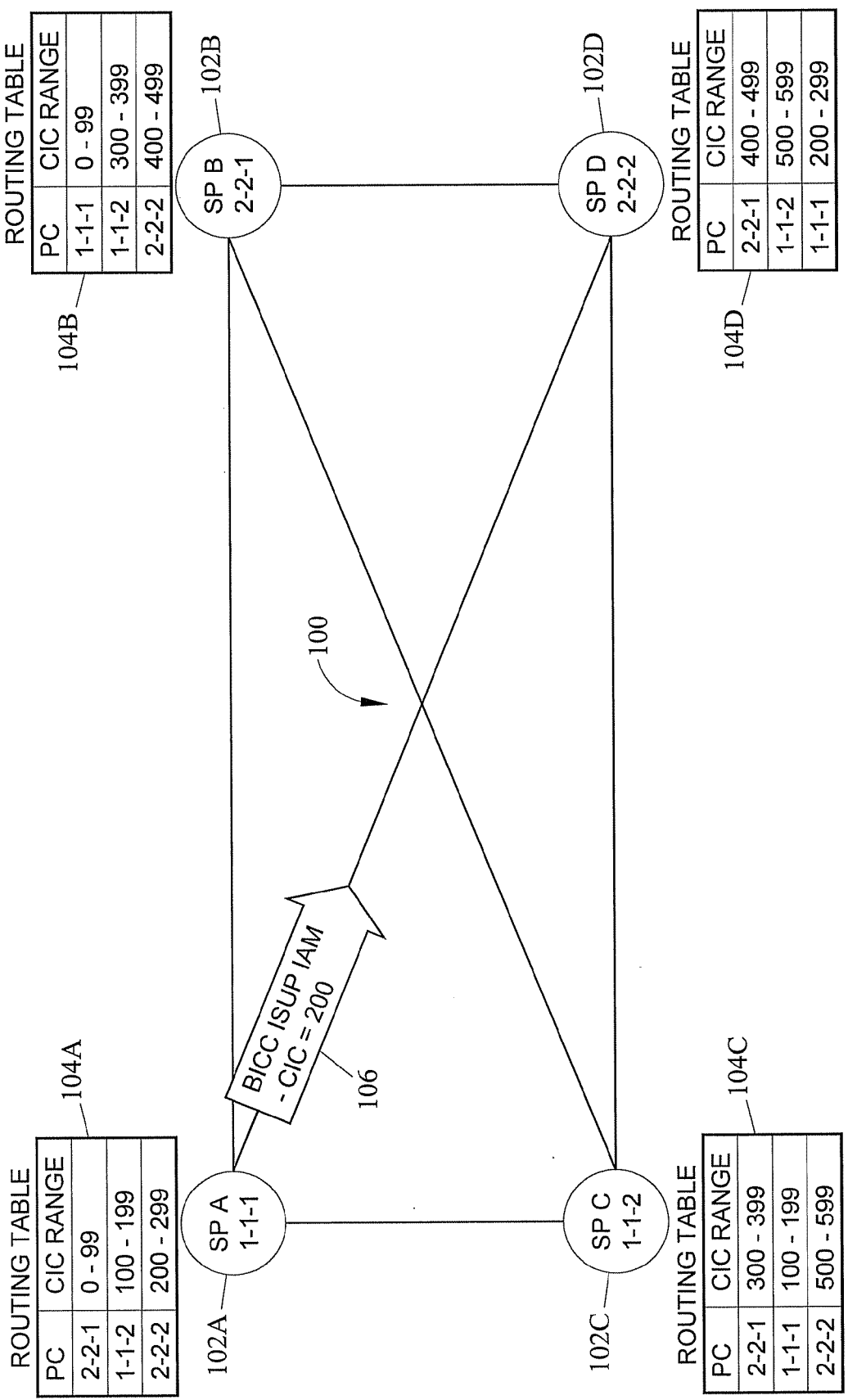
FIG. 1 is a network diagram illustrating routing of signaling messages in a conventional BICC network.

FIG. 1 is a network diagram illustrating routing of signaling messages in a conventional BICC network 100. As illustrated, BICC network 100 includes a plurality of BICC-capable signaling points (SPs) 102 arranged in a fully connected mesh topology. For example, SP A 102A is connected to each of the other SPs (i.e., 102B, 102C, and 102D) in the network 100 with a point-to-point link. As used herein, all SPs referred to are BICC-capable (i.e., compatible with the BICC protocol). Each SP 102A-D may include a statically provisioned routing table 104 that associates a block or range of call instance code values with each SP 102A-D in the mesh. As shown, routing table 104 includes two fields, a point code or 'PC' field that uniquely identifies each SP 102A-D and a 'CIC Range' field that contains a range of call instance code values used for communicating with a given SP. These ranges of call instance codes are agreed upon between the SPs 102. That is, a unique range is used for communicating between two nodes.

Prior to launching a call, an originating SP must select a destination SP and an available CIC associated with the destination SP based, at least in part, on the digits dialed by the calling party. As shown, SP A 102A sends a BICC call setup message 106 to SP D 102D using a CIC associated with SP D 102D. In the BICC call setup message, SP A 102A selects CIC 200 from the range of CIC values (200-299) associated with SP D 102D (i.e., point code 2-2-2) before sending message 106 to SP D 102D.

In order to provide connectivity to a new node in a fully connected mesh topology, each SP 102A-D must update or reprovision its routing table 104 whenever a new node is added. This updating or reprovisioning becomes very complex and expensive as nodes increase in the BICC network 100.

BICC Signaling Router (BSR)

As stated above, an important feature in one embodiment of the present subject matter is the use of a BICC signaling router (BSR) for performing centralized routing and CIC management for a plurality of BICC-capable SPs. Using a BSR, SPs can route signaling messages without maintaining network management information about other SPs. This greatly decreases the cost and complexity of maintenance while allowing BSR to provide additional features such as load sharing more efficiently than at the SPs.

Figure 2:
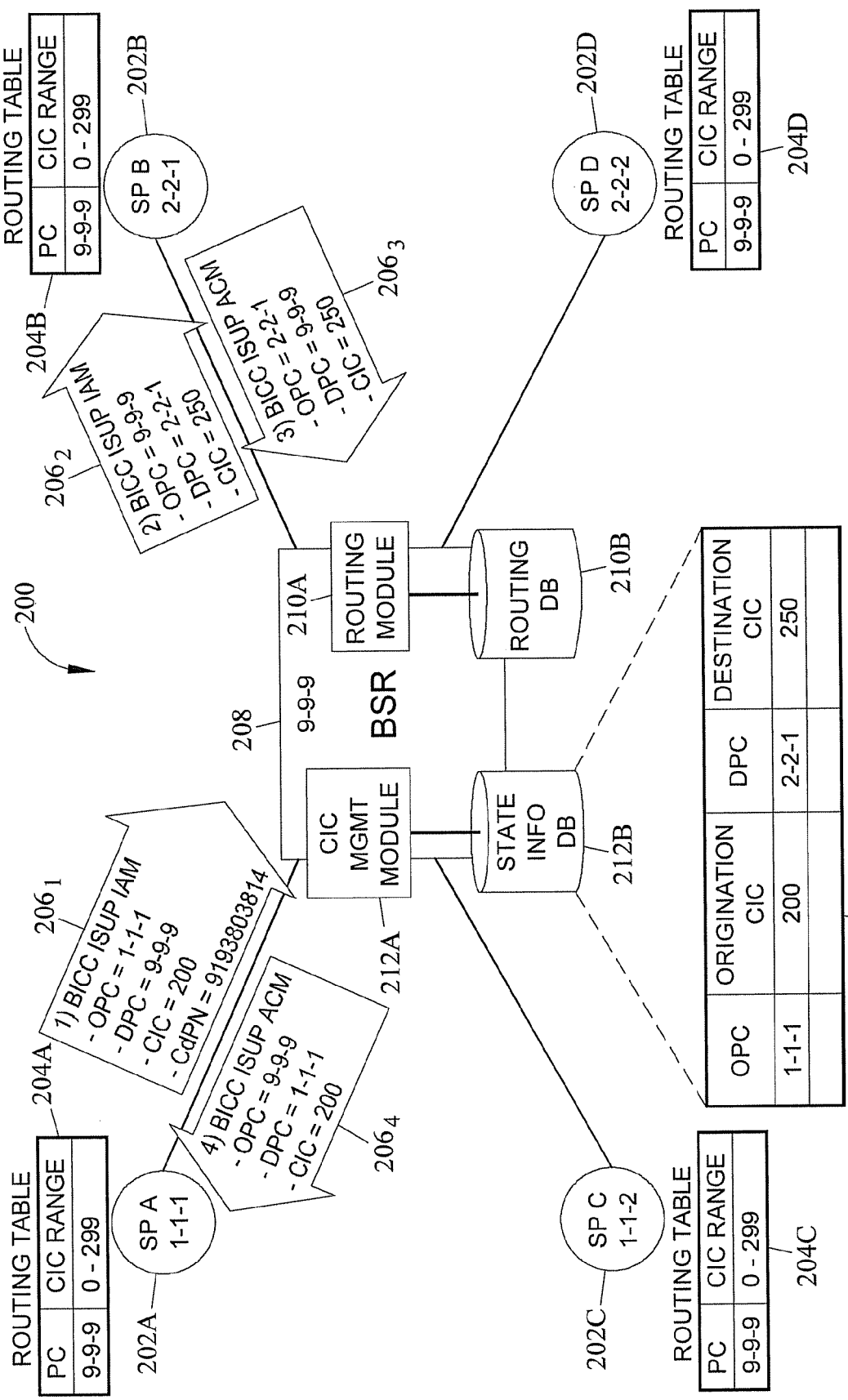
FIG. 2 is a network diagram of a network including a BICC signaling router (BSR) for performing centralized routing of BICC signaling messages and call instance code management, according to an embodiment of the subject matter described herein.

FIG. 2 is a diagram of a network 200 including a BICC signaling router (BSR) 208 for performing centralized routing of BICC signaling messages and CIC management therefor, according to an embodiment of the subject matter described herein. As depicted, network 200 includes a plurality of signaling points (SPs) 202A-D connected to each other via a BSR 208. SPs 202A-D may be any nodes capable of communicating using BICC signaling messages, examples of such nodes include SS7 signaling points (SPs), media gateway controllers (MGCs), mobile switching centers (MSCs), Class 5 end offices, softswitches, tandem switches, packet switches, time division multiplexed (TDM) switches, session border control nodes, gateway nodes, service control points (SCPs), application servers, voice mail servers, interactive voice response (IVR) servers, and the like. It should be understood that FIG. 2 shows a single BSR 208 for illustrative purposes and that the network 200 may include more than one BSR 208. In this embodiment, BSR 208 is a network element that can provide a centralized routing function, among other things, for BICC-capable call control elements (e.g., BICC-capable SPs) in a network. Further, BSR 208 may be a call mediation node (CMN) as specified by the ITU-T. BSR 208 may also be configured to communicate with the SPs 202 and store information gathered from the SPs 202. Further, BSR 208 may handle all routing of BICC signaling messages between SPs 202 in network 200 or a sub-portion of that network 200. Unlike in a conventional network 100 without a BSR 208, SPs 202 in network 200 are not required to associate CIC ranges with specific SPs 202. As discussed previously, such a priori designations can lead to inefficiencies with regard to load-sharing and BICC mesh growth. Instead, in one embodiment, an SP may associate all of its CICs with BSR 208. In such an embodiment, this arrangement allows any of an SP's CICs to be used with any call, regardless of where the call is destined. In an alternate embodiment, an SP may associate some of its CICs with BSR 208.

As shown, each SP 202A-D includes a routing table 204. Like in FIG. 1, routing table 204 includes two fields, a point code or 'PC' field that uniquely identifies each SP and a 'CIC Range' field that shows a range of CIC values used for communicating with a given SP. However, unlike in FIG. 1, the respective routing tables 204A-D of SPs A-D 202A-D have only one entry which is for BSR 208. That is, all of SPs 202 have associated all of their CICs with BSR 208. This arrangement allows all signaling messages 206 from SPs 202 to be routed by BSR 208. That is, before SP A 202A sends a BICC signaling message, SP A 202A selects, independently of a destination for the BICC signaling message, any available CIC from its routing table 204 since the only CIC range in table 204 is associated with BSR 208 (the point code 9-9-9), a call setup message $206_1$ (e.g., BICC ISUP IAM) may be generated and sent to BSR 208. Call setup message $206_1$ may include the selected CIC along with other information such as a calling party number (CgPN), a called party number (CdPN), the destination SIP address or point code (DPC), and the originating SIP address or point code (OPC). As used herein, all signaling messages including call setup messages 206 use the BICC protocol unless otherwise stated.

BSR 208 may receive message $206_1$ and determine that message $206_1$ is addressed to a point code associated with BSR 208 and therefore requires processing. BSR 208 may be adapted to determine the appropriate destination SP (e.g., based on the CdPN), and to select an available CIC associated with the destination SP (DPC). As depicted, BSR 208 includes a routing module 210A, a routing database 210B, a CIC management module 212B, and a state information database 212B.

Routing module 210A performs centralized routing for BICC signaling messages. CIC management module 212B performs centralized management of CICs associated with signaling sessions routed through BSR 208. Using these database 210B or other information, BSR 208 may determine that SP B 202B is the appropriate destination SP (i.e., DPC=2-2-1) and may select, using database 212B, 250 as an available CIC associated with SP B 202B. BSR 208 may maintain a state mapping 214 including the originating SIP address (e.g., OPC) and originating CIC to the destination SP address (e.g., DPC) and destination CIC in state information database 212B. Additional state information may also be stored in state information database 212B. For example, the additional state information may include available CICs at each SP, congestion states for each SP, and relative loading of each SP.

In the illustrated example, BSR 208 may modify call setup message $206_1$ to include the new DPC and associated CIC and route modified call setup message $206_2$ to SP B 202B. BSR 208 may remain in the call signaling path processing subsequent BICC signaling messages associated with the call to insure continuity using state mapping 214 or other information. For example, SP B 202B may generate and send an acknowledgement message $206_3$ (e.g., BICC ISUP ACM) to BSR 208 after receiving message $206_2$. BSR 208 may examine and process message $206_3$ by replacing the DPC and associated CIC with the OPC and associated CIC of original call setup message $206_1$. BSR 208 may route modified acknowledgement message $206_4$ to SP A 202A.

Figure 3:
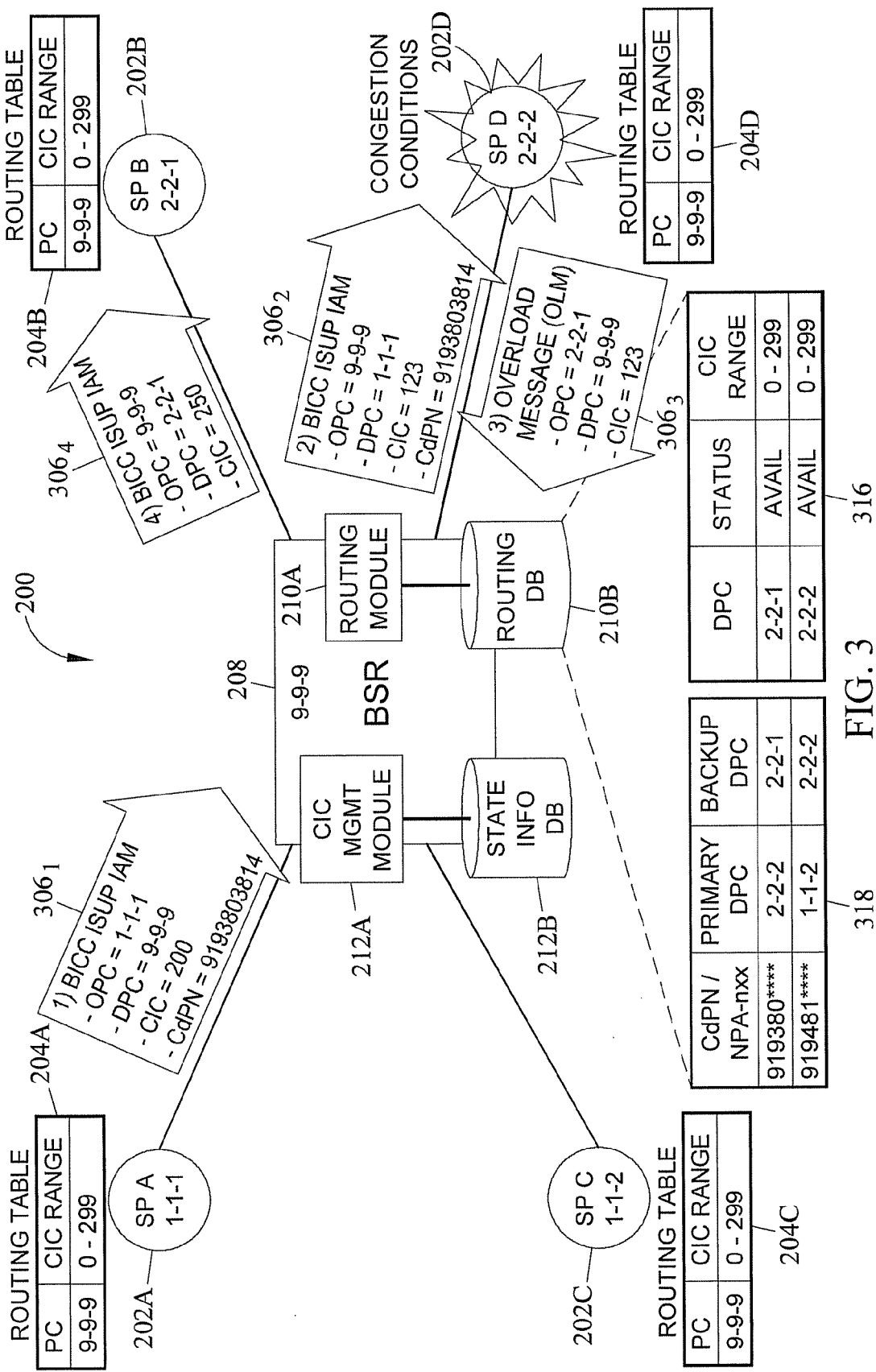
FIG. 3 is a network diagram where the BSR is configured for load balancing, according to an embodiment of the subject matter described herein.

FIG. 3 is a diagram of network 200 including BSR 208 for performing load balancing, according to an embodiment of the subject matter described herein. In this embodiment, BSR 208 is additionally configured to perform load balancing. When determining a destination or next-hop SP, BSR 208 may implement a load-sharing algorithm to generally avoid or reduce SP overloading problems in network 200. Further, BSR 208 may be configured to maintain routing database 210B that may include a central routing table 318 and a status table 316 among other things.

Routing table 318 may contain information about how to process given signaling messages. As shown, routing table 318 contains three fields: a 'CdPN/NPA-nxx' field which contains the called party directory number or a portion thereof, a 'Primary DPC' field which contains the primary SP which handles calls for that number, and a 'Secondary DPC' field which contains the secondary SP which handles calls for that number if the primary SP cannot (e.g., if is down or congested). Status table 316 may contain information on whether a given DPC (i.e., SP) is available to handle signaling messages and whether any associated CICs are available. As shown, status table 316 contains three fields: a 'DPC' field which contains SP point codes, a 'Status' field which contains status information about the SP (e.g., available, unavailable, congested, etc.), and a 'CIC Range' which contains CICs available for reaching given SPs. BSR 208 may use these databases and other maintained information to dynamically determine how BICC traffic should be routed and load balanced among SPs 202 in network 200. In other words, the information maintained by BSR 208 may be used to monitor the overload or congestion status of SPs 202 in network 200, and to dynamically load balance call traffic among SPs 202.

As shown, SP A 202A may be adapted to select any available CIC from its routing table 204A and generate a call setup message $306_1$ associated with a call attempt or CdPN of 91938038134. SP A 202A may send message $306_1$ to the point code of BSR 208 (i.e., point code address 9-9-9). In one embodiment, an available CIC may correspond to an available UDP port. In this example, SP A 202A may select CIC 200 which is associated with BSR 208. A call setup message $306_1$ (e.g., BICC ISUP IAM) may be generated, which may include the associated CIC and the CdPN among other information, and may be transmitted to BSR 208. BSR 208 may receive message $306_1$ and determine that message $306_1$ is addressed to a point code associated with BSR 208, and therefore requires processing. BSR 208 may examine the CdPN in message $306_1$ and determine, using its routing table 318 and status table 316 that the call should be routed to SP D 202D (point code=2-2-2), the primary SP (DPC) for servicing calls to 9193803814.

BICC Network Management

The present subject matter may also present benefits with regard to BICC network management. It will be appreciated that since an originating SP may be unaware of where a call will terminate at the time the originating SP launches a call setup message $306_1$ (because from the perspective of the originating SP, all call setup messages 306 are routed to BSR 208 and the selected CIC is associated with BSR 208), the originating SP does not have to have direct knowledge of the status of other SPs 202 in the network. As such, BSR 208 may be adapted to receive network management messages from SPs 202 and to respond appropriately to the network management messages. Network management messages may include any information about network 200 or signaling points 202 in network 200. Appropriate actions taken in response to network management messages may include making adjustments to routing table 318, updating network status information in status table 316 for the affected SP, sending a message to the originating node or other nodes (e.g., SPs and BSRs), and the like.

For example, if BSR 208 receives a call setup message $306_1$ (e.g., BICC ISUP IAM) from SP A 202A, BSR 208 may examine the CdPN in the message and determine using central routing table 318 and status table 316 that message $306_1$ should be routed to SP D 202D (the primary node for servicing calls to 9193803814). BSR 208 may modify message $306_1$ (e.g., with a new DPC and CIC) and may route modified message $306_2$ to SP D 202D. SP D 202D may be congested and may respond to call setup message $306_1$ by generating and sending a BICC Overload message (OLM) $306_3$ to BSR 208. Upon receiving OLM message $306_3$ from SP D 202D, BSR 208 may also update status table 316 and other maintained information to reflect the information in OLM message $306_3$. BSR 208 may select a new destination and CIC, such as SP B 202B (i.e., the backup node for servicing calls to 9193803814) and associated CIC value of 250 and modify the original call setup message $306_1$ to include the newly selected destination and associated CIC. BSR 208 may route modified message $306_4$ to SP B 202B. As stated, BSR 208 may be a stateful application. As such, BSR 208 may remain in the call signaling path processing (e.g., intercepting, modifying, and redirecting) subsequent signaling messages associated with the call to insure continuity using the information maintained by the BSR.

Thus, in this embodiment, BSR 208 may relieve each SP 202A-D of the complex logic required to effect dynamic route management in network 200. Otherwise, each SP 202A-D in network 200 would be required to implement network management procedures and change their routing accordingly.

Figure 4:
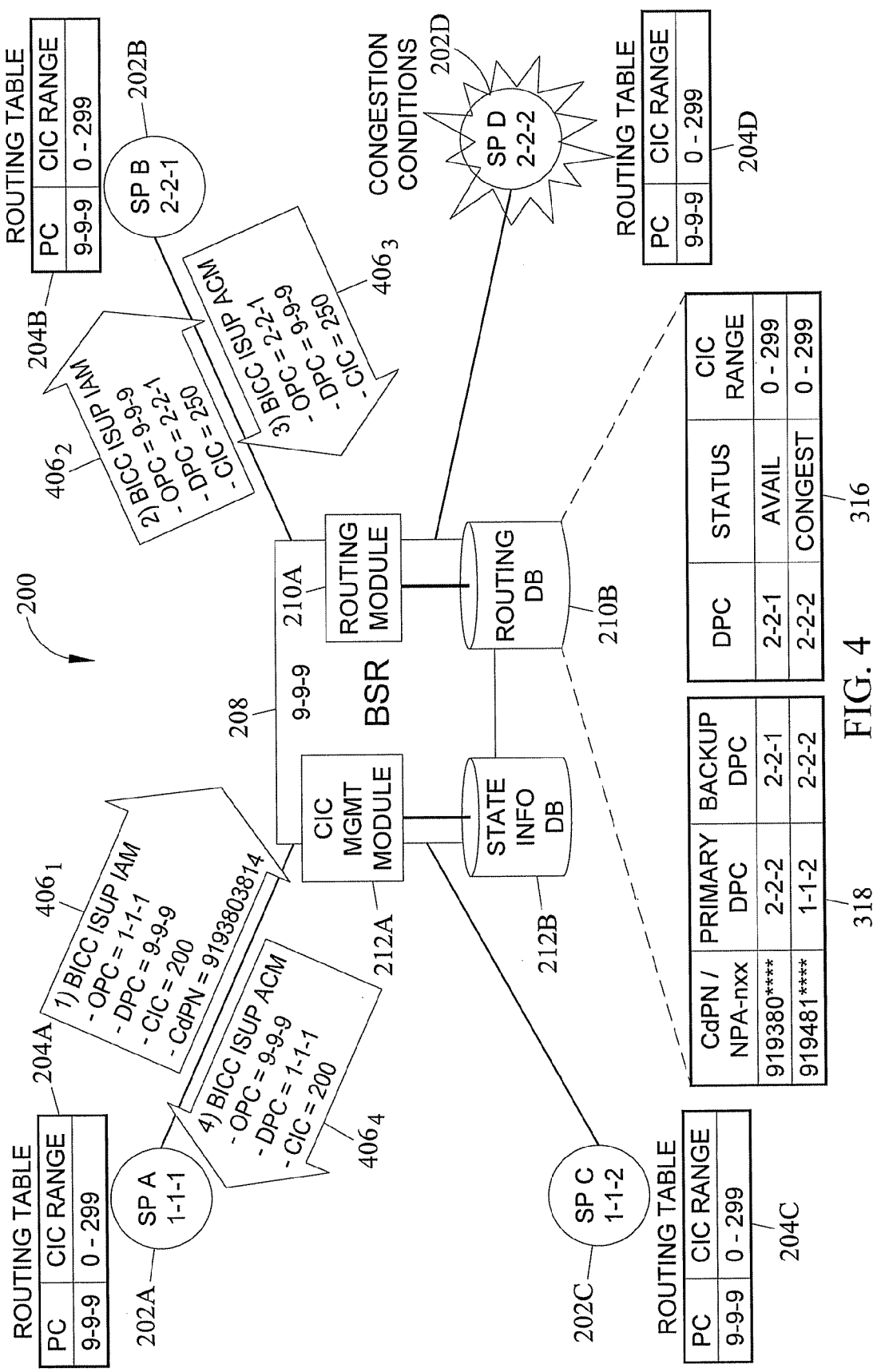
FIG. 4 a network diagram where the BSR has updated status information about a congested node and routes messages accordingly, according to an embodiment of the subject matter described herein.

FIG. 4 illustrates the network illustrated in FIG. 3 where BSR 208 has updated status information about node 202D and routes messages accordingly, according to an embodiment of the subject matter described herein. As shown, status table 316 shows SP D 202D as congested. In this embodiment, BSR 208 may avoid sending signaling messages to SP D 202D until SP D 202D is no longer determined to be congested.

For example, SP A 202A may select any available CIC from its routing table 204A and generate a call setup message $406_1$ associated with a call attempt or CdPN of 91938038134. SP A 202A may send message $406_1$ to the point code address of BSR 208 (i.e., point code address 9-9-9). BSR 208 may receive message $406_1$ and determine that message $406_1$ is addressed to a point code address associated with BSR 208, and therefore requires processing. BSR 208 may examine the CdPN in message $406_1$ and determine, using its routing table 318 and other information that the call should be routed to SP D 202D (point code=2-2-2), the primary SP (DPC) for servicing calls to 9193803814.

BSR 208 may use status table 316 to determine that SP 202D (i.e., the primary DPC) is congested or overloaded. BSR 208 may determine, using routing table 318 and other information, message $406_1$ should be directed to the backup or secondary SP (DPC) for servicing calls to 9193803814, thereby avoiding congested SP 202D. As such, BSR 208 may select SP B 202B (point code=2-2-1) as the destination SP and an available CIC associated with SP B 202B (e.g., CIC 250). BSR 208 may modify call setup message $406_1$ to include BSR 208 point code address (i.e., 9-9-9) as the OPC, destination SP B 202B point code 2-2-1 as the new DPC, and the selected CIC associated with SP B 202B in modified message $406_2$. BSR 208 may map the originally specified CIC (i.e., 200) and OPC (i.e., 1-1-1) to the newly selected CIC (i.e., 250) and DPC (i.e., 2-2-1). This state mapping may be maintained by BSR 208. In one embodiment, this mapping may be maintained in state information database 212 (shown in FIG. 2 as state mapping 214). BSR 208 may route modified call setup message $406_2$ to SP B 202B. SP B 202B may send a response message $406_3$ back using an available CIC associated with BSR 208. BSR 208 may use the recorded state information to modify response message $406_3$ and route modified message $406_4$ to the originating node SP A 202A.

BSR with Number Portability Functionality

Figure 5:
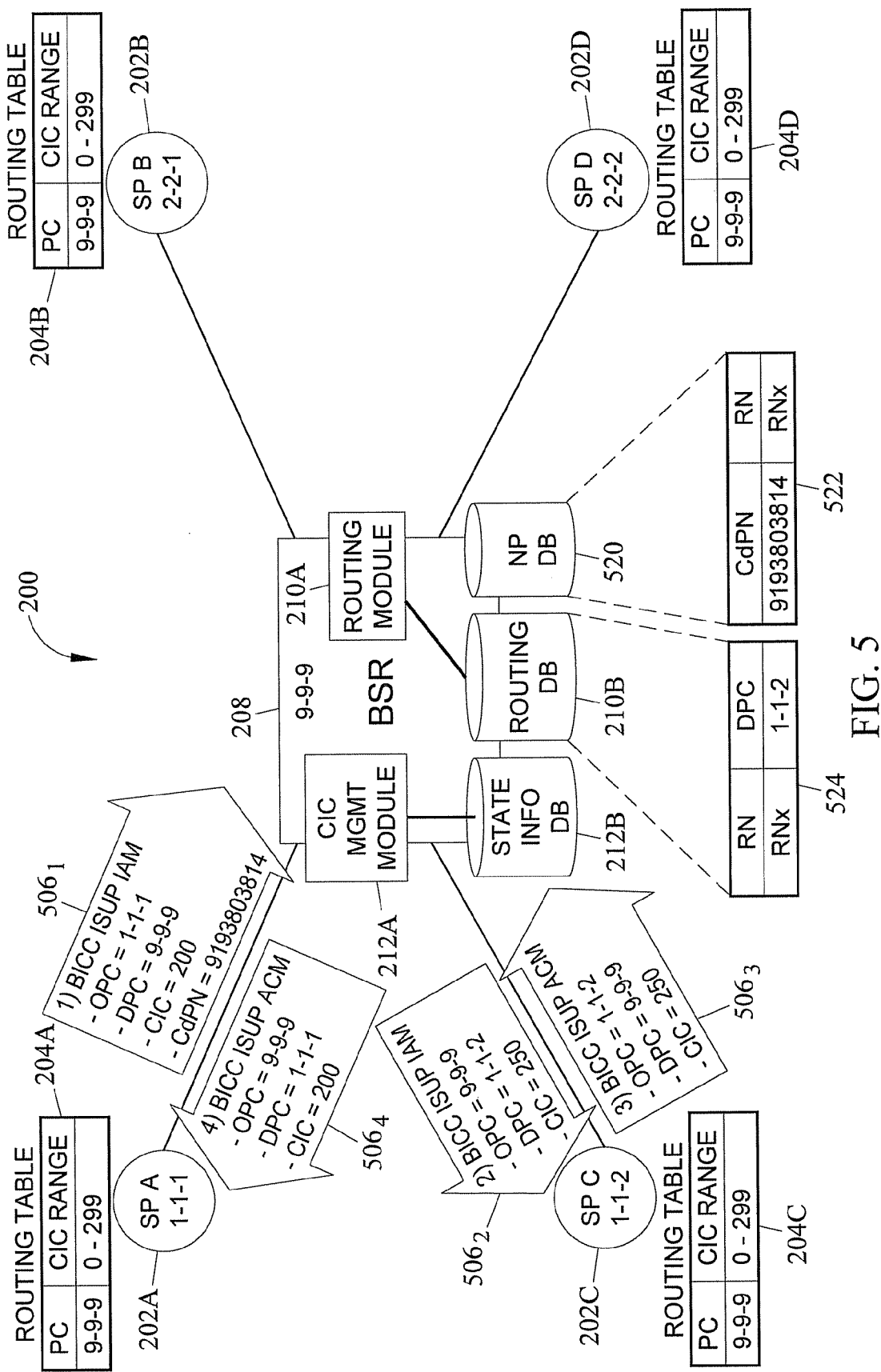
FIG. 5 a network diagram where the BSR is configured for number portability, according to an embodiment of the subject matter described herein.

FIG. 5 illustrates network 200 where BSR 208 is configured for number portability, according to an embodiment of the subject matter described herein. In this embodiment, BSR 208 includes functionality for querying or accessing a number portability (NP) database 520. NP databases are well known in the art. As shown, number portability database 520 includes a subscriber table 522. Subscriber table 522 may include mappings of a subscriber identifier (e.g., CdPN, POTS number, MSISDN, Mobile Identification Number, IMSI, etc.) to a ported-to or serving network switch identifier (e.g., routing number (RN), mobile switch routing number (MSRN), point code, IP, port, etc.). Additionally, routing database 210 of BSR 208 may include a switch table 524. Switch table 524 may include mappings of a network switch identifier (e.g., RN, LRN, MSRN) to a routable network address (e.g., SS7 point code address, IP address/port). BSR 208 may use the database and tables for integrated number portability functionality with BICC signaling messages.

For example, BSR 208 may receive a call setup message $506_1$ (e.g., BICC ISUP IAM) from originating node SP A 202A that includes a called party identifier, such as a called party number (CdPN) of 9193803814. BSR 208 may query or access the NP database 520 and its subscriber table 522 using the CdPN value and obtain a routing number (RN) of RNx. The RN may be translated or mapped, using the switch table 524, to a point code of 1-1-2 which is associated with SP C 202C. BSR 208 may select an available CIC of 250 associated with SP C 202C. BSR 208 may record necessary state information, modify message $506_1$ to include the selected CIC and point code of SP C 202C, and route modified message $506_2$ to SP C 202C. SP C 202C may send a response message $506_3$ to BSR 208 using an available CIC associated with BSR 208. BSR 208 may use the recorded state information to modify response message $506_3$ and route modified message $506_4$ to originating node SP A 202A.

BSR with HLR/HSS Access Functionality

Figure 6:
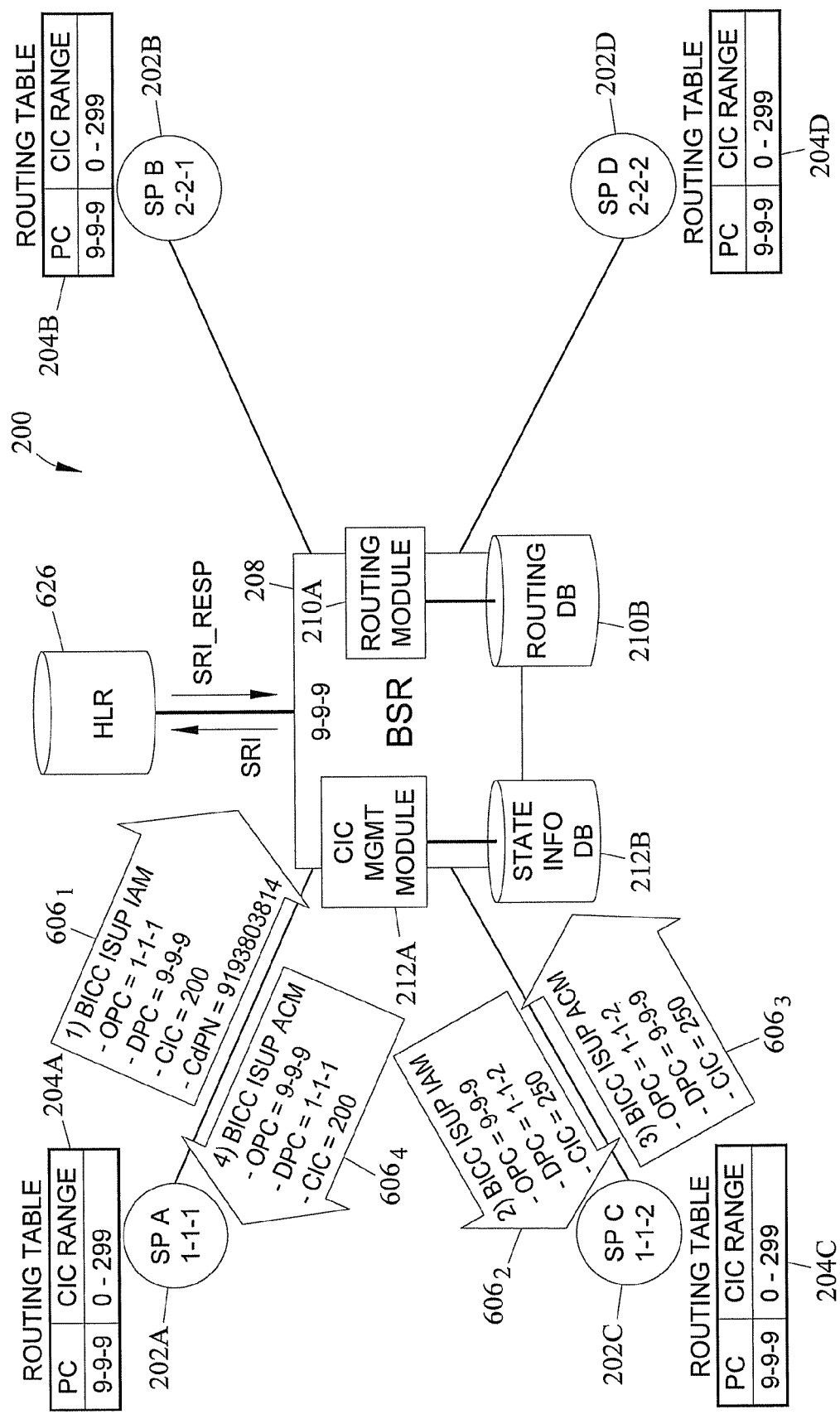
FIG. 6 a network diagram where the BSR is configured for home location register (HLR) access, according to an embodiment of the subject matter described herein.

FIG. 6 is network 200 wherein BSR 208 is configured for home location register (HLR) or home subscriber server (HSS) access, according to an embodiment of the subject matter described herein. In this embodiment, BSR 208 includes functionality for querying or accessing a home location register (HLR) 626 for routing instructions related to a called mobile subscriber. An HLR, such as HLR 626, is a database that contains mobile subscription and location information for mobile subscribers. In one embodiment, the originating SP does not query the called party's HLR 626 prior to launching the call. Instead, the originating SP simply generates and sends a call setup message (e.g., BICC ISUP IAM) including the called mobile subscriber identifier (e.g., MSISDN, IMSI, MIN, etc.).

As shown, SP A 202A selects a CIC of 200, generates a call setup message $606_1$ including the called mobile subscriber identifier, and sends call setup message 606, to BSR 208 for processing. BSR 208 receives message $606_1$, extracts the called mobile subscriber identifier (the CdPN), generates an HLR query (e.g., a send routing information (SRI, location request, or other message) for requesting instructions for routing the call to the called mobile subscriber and send the query to HLR 626. HLR 626 responds with information, which identifies the mobile switching center (MSC) that is serving the called mobile subscriber. Using the information provided by HLR 626, BSR 208 may determine and select an appropriate SP (i.e., SP C 202C) and select an available CIC (i.e., 250) associated with SP C 202C. BSR 208 may record necessary state information, modify the message $606_1$ to include the selected CIC and point code of SP C 202C, and route the modified message $606_2$ to SP C 202C. SP C 202C may send a response message $606_3$ to BSR 208 using an available CIC associated with BSR 208. BSR 208 may use the recorded state information to modify response message $606_3$ and route modified message $606_4$ to originating node SP A 202A.

It will be appreciated that in an alternate embodiment, BSR 208 may communicate/interface with other types of subscriber information and mobility management database servers, such as an IP multimedia subsystem (IMS) or Long Term Evolution (LTE) home subscriber server (HSS) or the like, to provide routing control functionality similar to that described above with respect to the GSM/I-S41 HLR embodiment.

BSR with Prepaid Services Access Functionality

Figure 7:
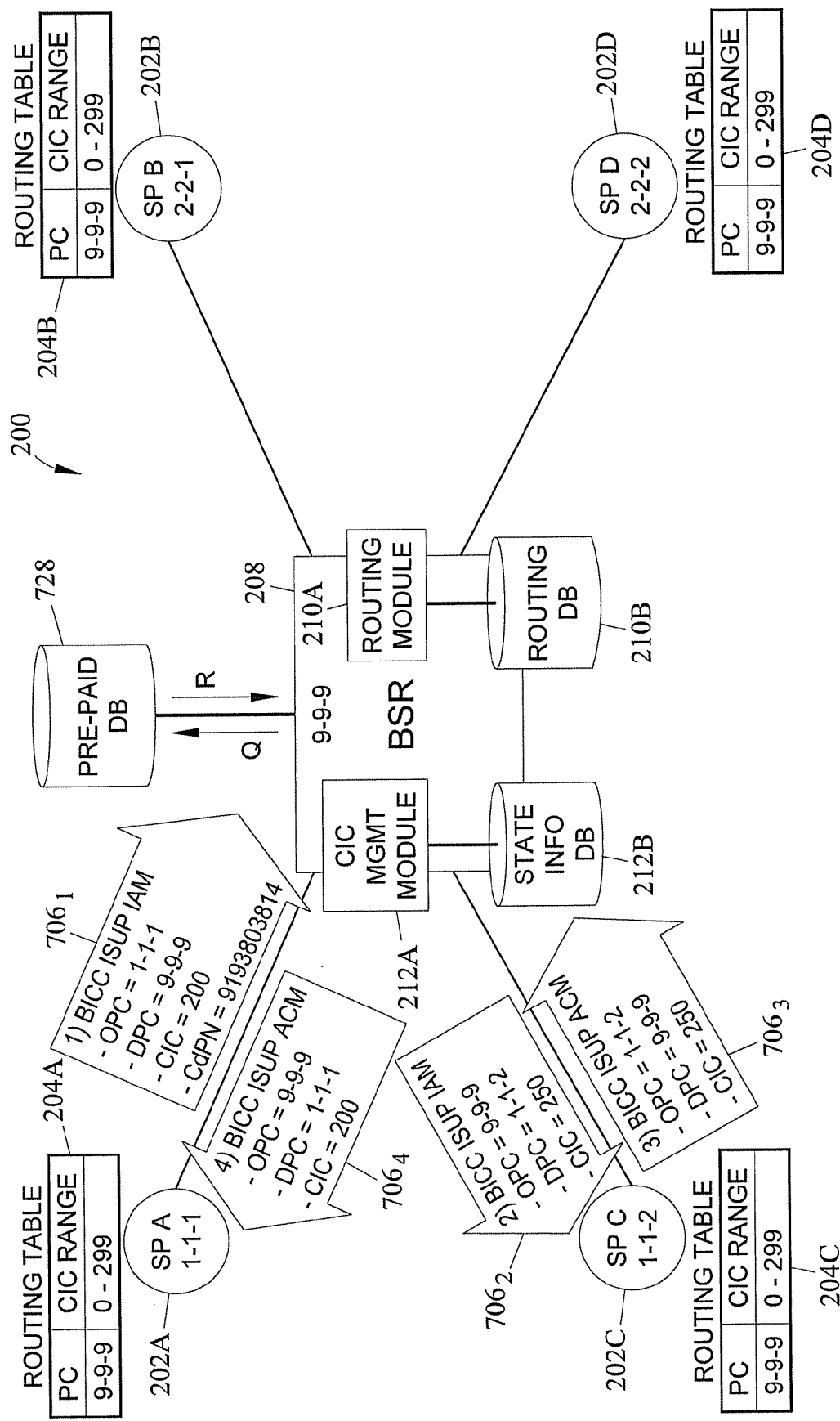
FIG. 7 is a network diagram where the BSR is configured for prepaid services access, according to an embodiment of the subject matter described herein.

FIG. 7 illustrates network 200 where BSR 208 is configured for prepaid services access, according to an embodiment of the subject matter described herein. In this embodiment, BSR 208 includes functionality for querying or accessing a prepaid services platform or database 728 for obtaining prepaid services information associated with a calling or called party. BSR 208 may use information obtained from the prepaid platform 728 for determining whether to allow call setup to occur or whether to continue with call setup.

For example, BSR 208 may receive a call setup message $706_1$ from originating SP A 202A. BSR 208 may access prepaid platform 728 determine that a called or calling party does not have sufficient prepaid credit for the requested call. BSR 208 may respond to the originating SP with an end or release message, thereby effectively blocking and preventing the call. Alternatively. BSR 208 may determine that there is sufficient prepaid credit for the requested call. If there is sufficient prepaid credit for the requested call. BSR 208 may modify and route call setup message $706_1$ as appropriate. For example, BSR 208 may determine and select an appropriate SP (i.e., SP C 202C) and select an available CIC (i.e., 250) associated with SP C 202C for sending message $706_1$. BSR 208 may record necessary state information, modify message $706_1$ to include the selected CIC and point code of SP C 202C, and route modified message $706_2$ to SP C 202C.

In another embodiment. BSR 208, which may remain in the call signaling path, is adapted to interact or interface with the prepaid platform 728 to enforce a prepaid policy. That is, BSR 208 may monitor the prepaid credit balance of a called or calling prepaid subscriber using prepaid platform 728 and terminate the call at the point of credit exhaustion. For example, SP C 202C may send a response message $706_3$ back using an available CIC associated with BSR 208. BSR 208 may determine if prepaid credit has been exhausted. If prepaid credit has been exhausted. BSR 208 may respond to SP C 202C or SP A 202A with an end or release message, thereby effectively blocking and preventing the call. If prepaid credit has not been exhausted, BSR 208 may use the recorded state information to modify response message $706_3$ and route modified message $706_4$ to originating node SP A 202A.

Further, in this embodiment, BSR 208 may be adapted to identify calls to emergency service-related called party (e.g., a 911 call), and to permit such calls regardless of prepaid credit balance. Also, calls to the pre-paid service provider (i.e., for the purpose of reporting problems, re-charging the account, etc.) may also be identified and allowed regardless of prepaid credit balance.

BSR with Advanced Routing Functionality

Figure 8:
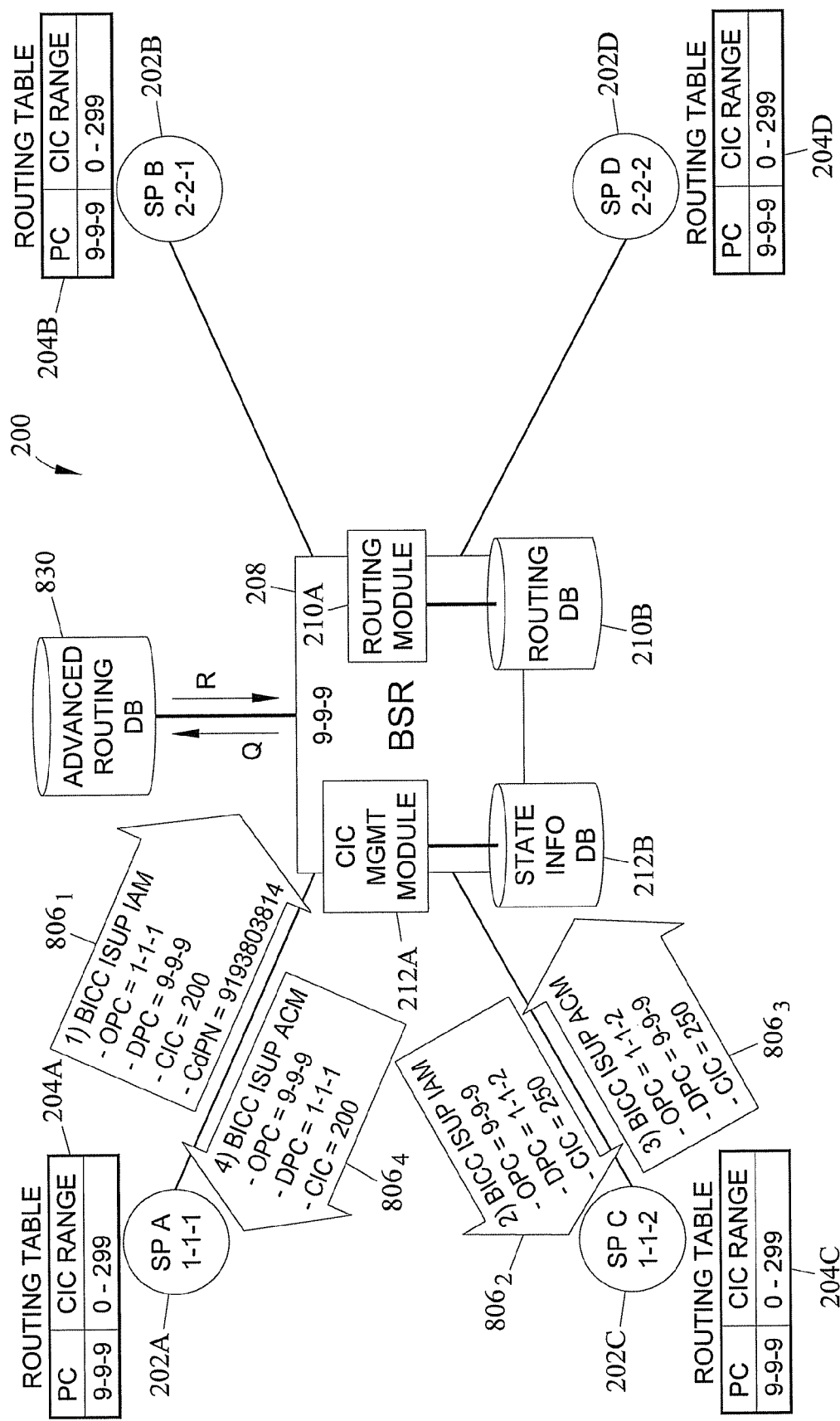
FIG. 8 is a network diagram where the BSR is configured for performing advanced routing, according to an embodiment of the subject matter described herein.

FIG. 8 illustrates network 200 where BSR 208 is configured for performing advanced routing, according to an embodiment of the subject matter described herein. In this embodiment. BSR 208 includes functionality for querying or accessing an advanced routing platform or database 830 for advanced routing services.

Advanced routing services may include any advanced routing services described or defined within the Bellcore-Telcorida Intelligent Network (IN) or Advanced Intelligent Network (AIN) framework. Exemplary advanced routing services may include, but are not limited to: time-of-day, or day-of-week, least-cost routing, alternate carrier routing, etc.

For example, BSR 208 may receive a call setup message $806_1$ (e.g., BICC ISUP IAM message) from an originating node SP A 202A, where the call setup message $806_1$ includes a CdPN and a CIC. BSR 208 may consult advanced routing platform 830 for routing instructions. In one embodiment, the advanced routing instructions may be based on parameters not contained in the received call setup message $806_1$. For example, the advanced routing instructions may direct all calls made at a certain time of day or on a certain day of week to be routed through a specific carrier regardless of the calling or called party. In another embodiment, BSR 208 may extract information from the received call setup message $806_1$ (e.g., the CdPN) and use this information to query or access advanced routing platform 830. In one embodiment, advanced routing platform 830 may return a carrier identifier, which BSR 208 may subsequently map to a routable network address (e.g., a point code). In another embodiment, the advanced routing database may return a routable network address. Using the information provided by advanced routing platform 830. BSR 208 may determine and select SP C 202C as the appropriate intermediate or destination node and select an available CIC (i.e., 250) associated with SP C 202C. BSR 208 may record necessary state information, modify message $806_1$ to include the selected CIC and point code of SP C 202C, and route modified message $806_2$ to SP C 202C. SP C 202C may send a response message $806_3$ to BSR 208 using an available CIC associated with BSR 208. BSR 208 may use the recorded state information to modify response message $806_3$ and route modified message $806_4$ to originating node SP A 202A.

BSR with Toll-free Routing Functionality

Figure 9:
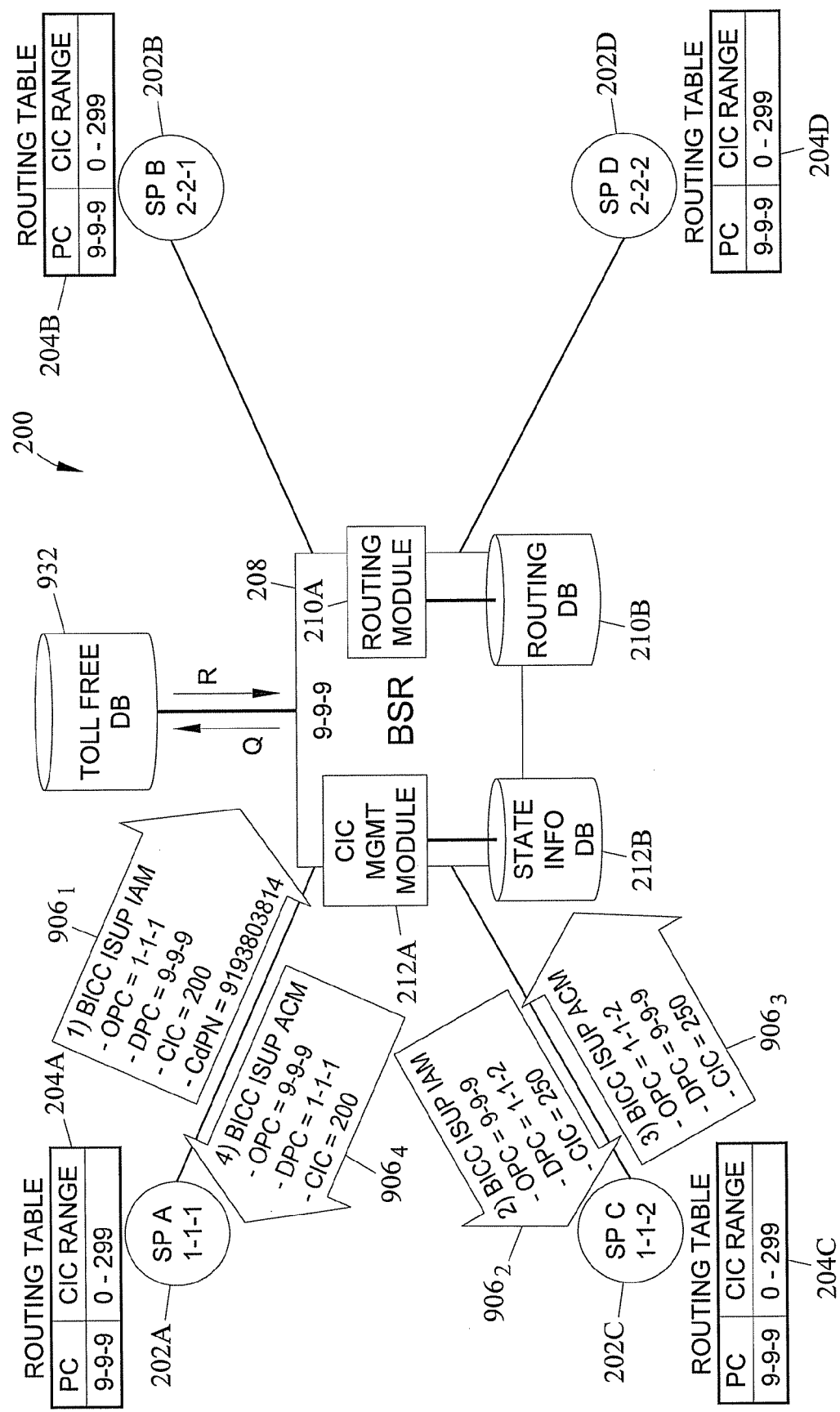
FIG. 9 a network diagram where the BSR is configured for performing toll-free routing, according to an embodiment of the subject matter described herein.

FIG. 9 illustrates network 200 where BSR 208 is configured for performing toll-free routing, according to an embodiment of the subject matter described herein. In this embodiment, BSR 208 includes functionality for querying or accessing a toll-free database 932 for translating toll-free numbers. BSR 208 may use information obtained from a call setup message 906 when querying toll-free database 932.

For example, an originating node SP A 202A may generate and launch a call setup message $906_1$ that includes a CIC and a toll-free called party identifier (e.g., an 800 number). BSR 208 may receive call setup message $906_1$ and extract the toll-free dialed digits or number from message $906_1$. BSR 208 may query or access toll-free database 932 using the extracted toll free number. Toll-free database 932 may return a translated CdPN identifier or number. Using this translated CdPN number, BSR 208 may determine and select SP C 202C as the appropriate intermediate or destination node and select an available CIC (i.e., 250) associated with SP C 202C. BSR 208 may record necessary state information, modify message $906_1$ to include the selected CIC and point code of SP C 202C, and route modified message $906_2$ to SP C 202C. SP C 202C may send a response message $906_3$ back using an available CIC associated with BSR 208. BSR 208 may use the recorded state information to modify response message $906_3$ and route modified message $906_4$ to originating node SP A 202A.

BSR with Short Code Routing Functionality

Figure 10:
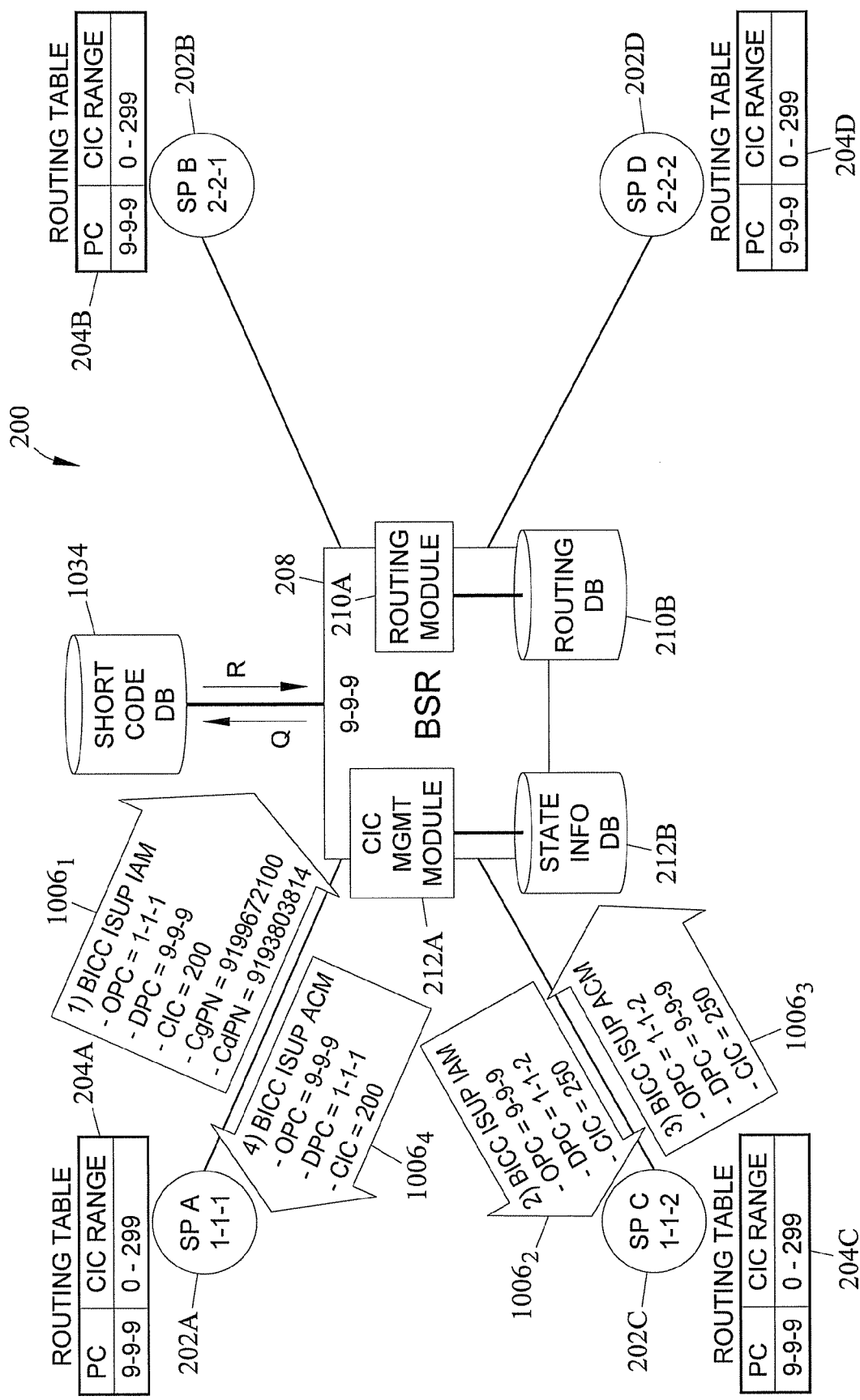
FIG. 10 is a network diagram where the BSR is configured for performing short code routing, according to an embodiment of the subject matter described herein.

FIG. 10 illustrates network 200 wherein BSR 208 is configured for performing short code routing, according to an embodiment of the subject matter described herein. In this embodiment, BSR 208 includes functionality for querying or accessing a short code database 1034 for translating short code addresses. BSR 208 may use information obtained from a call setup message 906 when querying short code database 1034.

For example, an originating node SP A 202A may generate and launch a call setup message $1006_1$ that includes a CIC, a calling party number (CgPN) identifier, and a called short code identifier (e.g., a 4-digit number). BSR 208 may receive the call setup message $1006_1$ and extract both the CgPN identifier and the called short code identifier. BSR 208 may query or access a short code database using the CgPN and called short code identifiers. Short code database 1034 may include data structures which associate calling party and called short code tuples with a full 10 digit identifier or other fully-formatted (e.g., E.212, E.164, etc.) subscriber identifier. Short code database 1034 may return a fully specified, dialable subscriber identifier. Using the returned fully specified subscriber identifier. BSR 208 may determine and select SP C 202C as the appropriate intermediate or destination node and select an available CIC (i.e., 250) associated with SP C 202C. BSR 208 may record necessary state information, modify message $1006_1$ to include the selected CIC and point code of SP C 202C, and route modified message $1006_2$ to SP C 202C. SP C 202C may send a response message $1006_3$ to BSR 208 using an available CIC associated with BSR 208. BSR 208 may use the recorded state information to modify response message $1006_3$ and route modified message $1006_4$ to originating node SP A 202A.

This functionality in this embodiment enables BICC network subscribers to place calls to subscriber-specified, subscriber-specific short codes. These short code addresses are resolved at BSR 208, and call routing is determined based on the resolved short code identifier.

BSR with Voice Mail Routing Functionality

Figure 11:
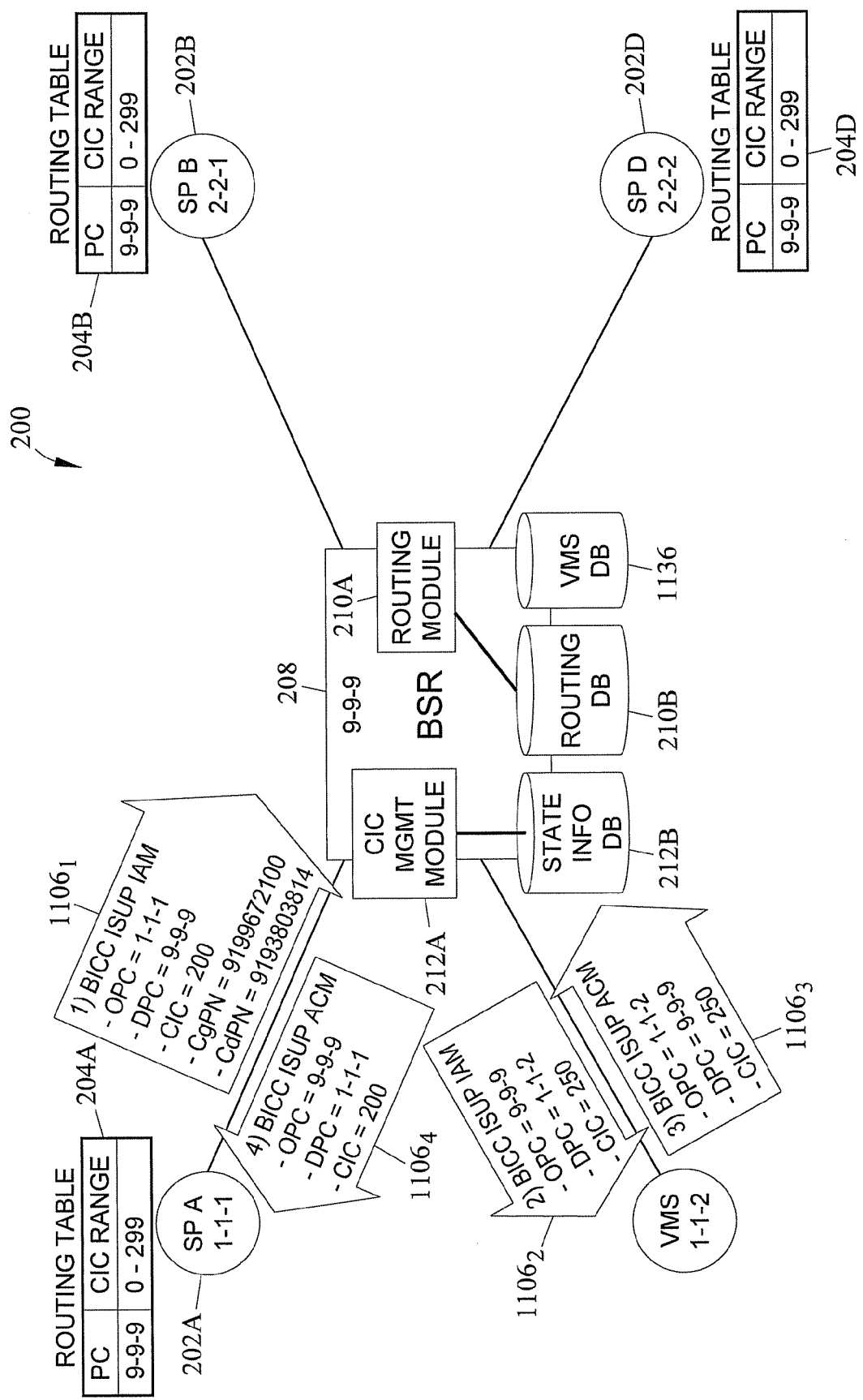
FIG. 11 is a network diagram where the BSR is configured for performing voice mail routing, according to an embodiment of the subject matter described herein.

FIG. 11 illustrates network 200 where BSR 208 is configured for performing voice mail routing, according to an embodiment of the subject matter described herein. In this embodiment. BSR 208 includes functionality for querying or accessing voice mail service (VMS) database 1136.

For example, an originating node SP A 202A may generate and launch a call setup message $1106_1$ that includes a CIC, a CgPN identifier, and a CdPN identifier. BSR 208 may receive the call setup message $1106_1$ and, using the CdPN, may examine state information maintained by BSR 208. Using this information, BSR 208 may determine whether the called party is currently engaged on a call (i.e., busy) and if the CdPN and CgPN are the same. If the CdPN is not the same as the CgPN, but the CdPN is busy, then BSR 208 may determine which voice mail server to route the call to by querying or accessing VMS database 1136. VMS database 1136 may associate a voice mail subscriber with a voice mail server. If the CdPN and CgPN are the same, then BSR 208 may consult VMS database 1136 for determining the appropriate voice mail deposit or retrieval server. BSR 208 may determine and select SP C 202C as the appropriate intermediate or destination node of voice mail retrieval server and select an available CIC (i.e., 250) associated with SP C 202C. BSR 208 may record necessary state information, modify message $1006_1$ to include the selected CIC and point code of SP C 202C, and route modified message $1006_2$ to SP C 202C. SP C 202C may send a response message $1006_3$ to BSR 208 using an available CIC associated with BSR 208. BSR 208 may use the recorded state information to modify response message $1006_3$ and route modified message $1006_4$ to originating node SP A 202A.

BSR with Signaling Message Monitoring Functionality

Figure 12:
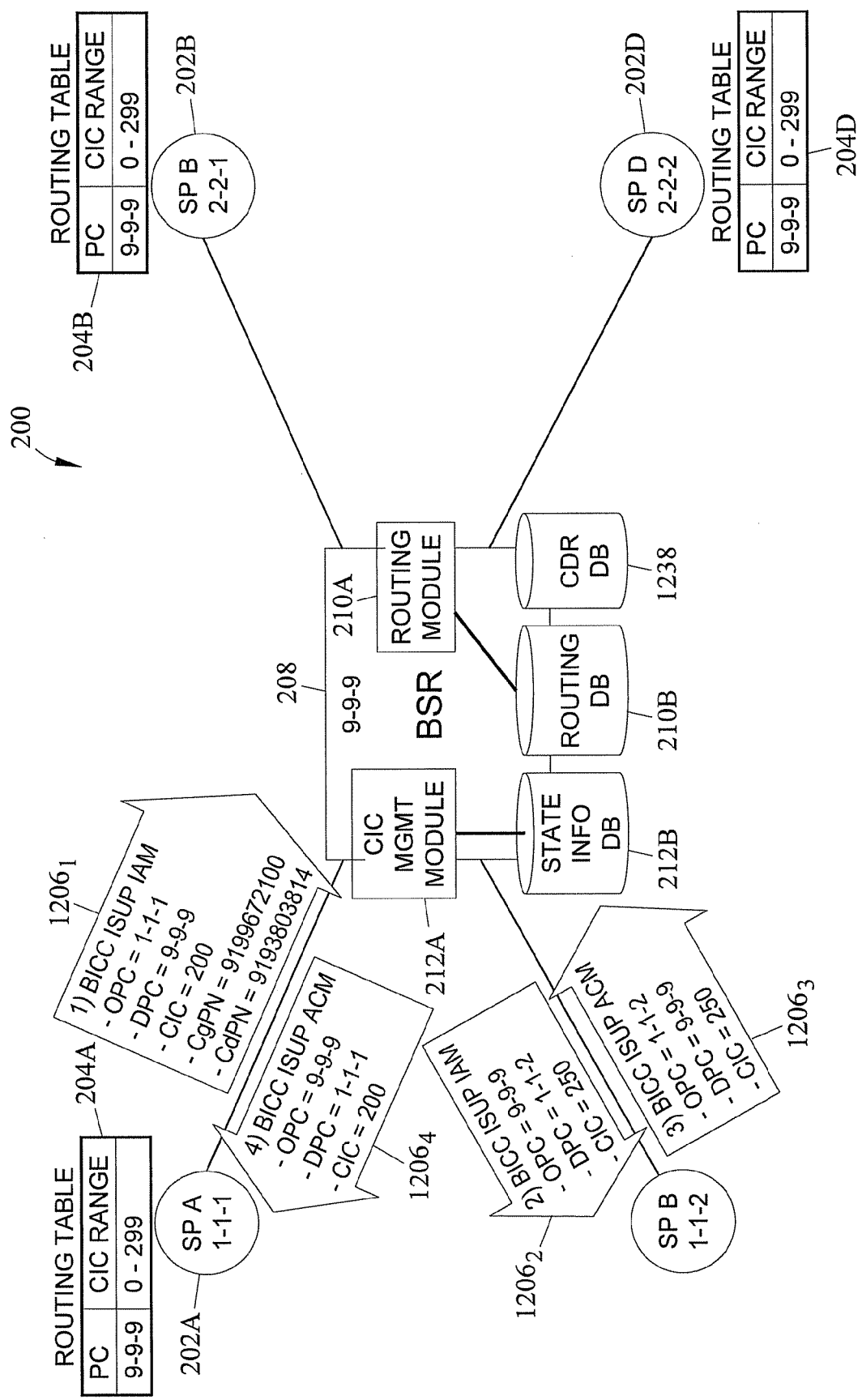
FIG. 12 is a network diagram where the BSR is configured for performing signaling message monitoring, according to an embodiment of the subject matter described herein.

FIG. 12 illustrates network 200 where BSR 208 is configured for performing signaling message monitoring, according to an embodiment of the subject matter described herein. In this embodiment, BSR 208 includes functionality for generating information about calls and for storing and retrieving this information to and from a call detail record (CDR) database 1238.

For example, an originating node SP A 202A may generate and launch a call setup message $1206_1$ that includes a CIC, a CgPN identifier, and a CdPN identifier. BSR 208 may receive the call setup message $1206_1$ and may generate call detail records (CDR) associated with the call. In one embodiment, BSR 208 may include information in the CDR record that identifies the state information (i.e., OPC-DPC-CIC) mappings maintained by BSR 208. In one embodiment, the CDR is generated and stored at BSR 208. In another embodiment, BSR 208 is adapted to copy some or all of the signaling messages received and send the copied information to an off-board CDR platform or database. BSR 208 or the off-board CDR platform may use the copied information to generate CDRs and may use the CDRs or the copied signaling information for any suitable network data analysis application, including billing, billing verification, fraud detection, network planning, etc.

BSR with Presence Database Access Functionality

Figure 13:
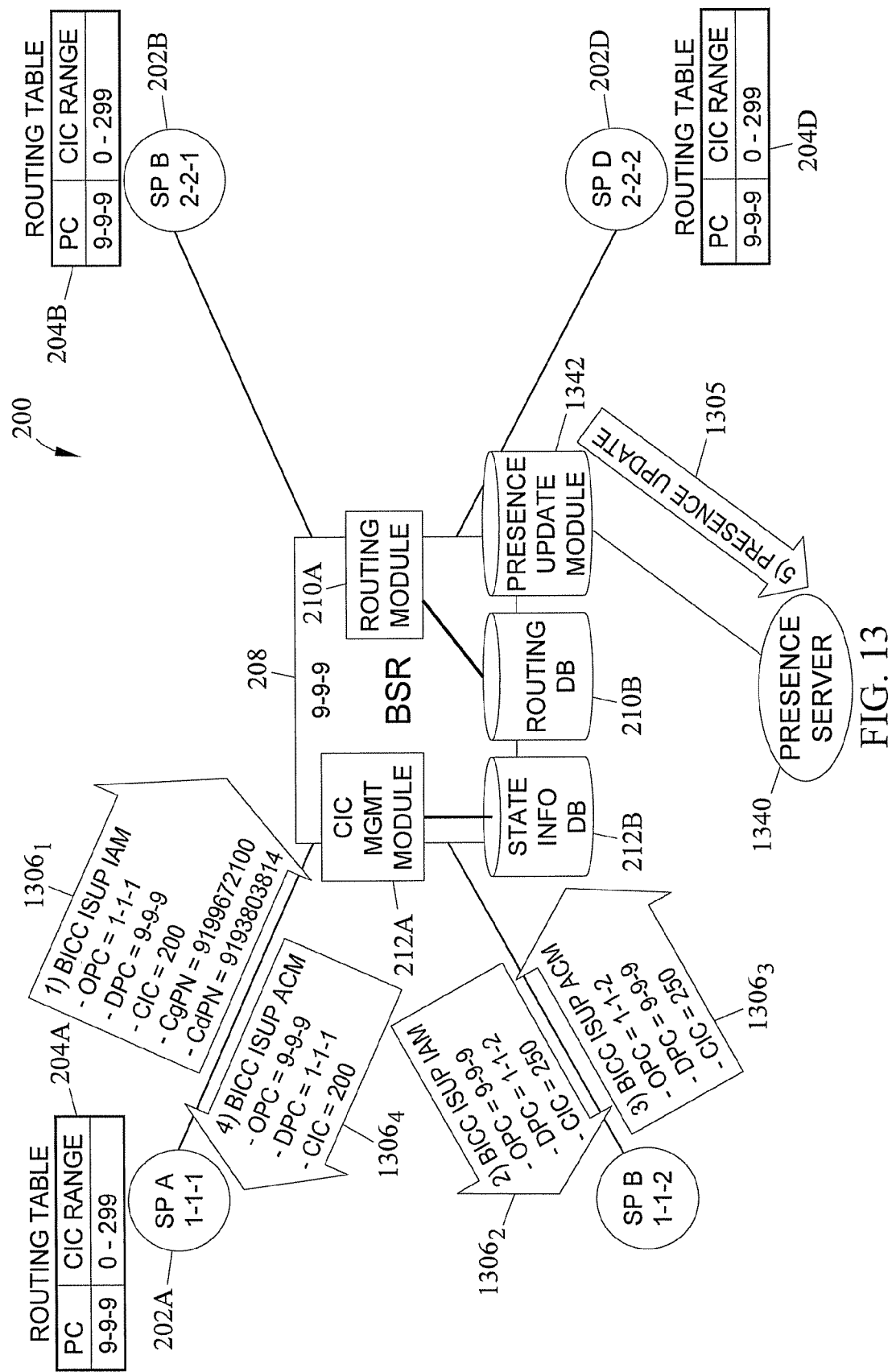
FIG. 13 is a network diagram where the BSR is configured to access a presence database, according to an embodiment of the subject matter described herein.

FIG. 13 illustrates network 200 where BSR 208 is configured for performing presence database access, including presence information updating, according to an embodiment of the subject matter described herein. In this embodiment, BSR 208 includes a presence update module 1342 which generates presence update messages using information from BICC signaling messages associated with a call.

For example, an originating node SP A 202A may generate and launch a call setup message $1206_1$ that includes a CIC, a CgPN identifier, and a CdPN identifier. BSR 208 may receive the call setup message $1206_1$ and subsequent signaling messages associated with a call from a calling party to a called party. Presence service update function 1342 associated with BSR 208 may be adapted to extract information from the signaling messages associated with the call and to generate a presence update message 1305 that includes, or indicates presence status information associated with the calling and/or called party. For example, presence update message 1305 may indicate the calling party is engaged on a call and is therefore busy. In one embodiment, presence update message 1305 is communicated to a presence server 1340 that is serving the calling or called party.

BSR with Prepaid Zero Balance Screening Functionality

Figure 14:
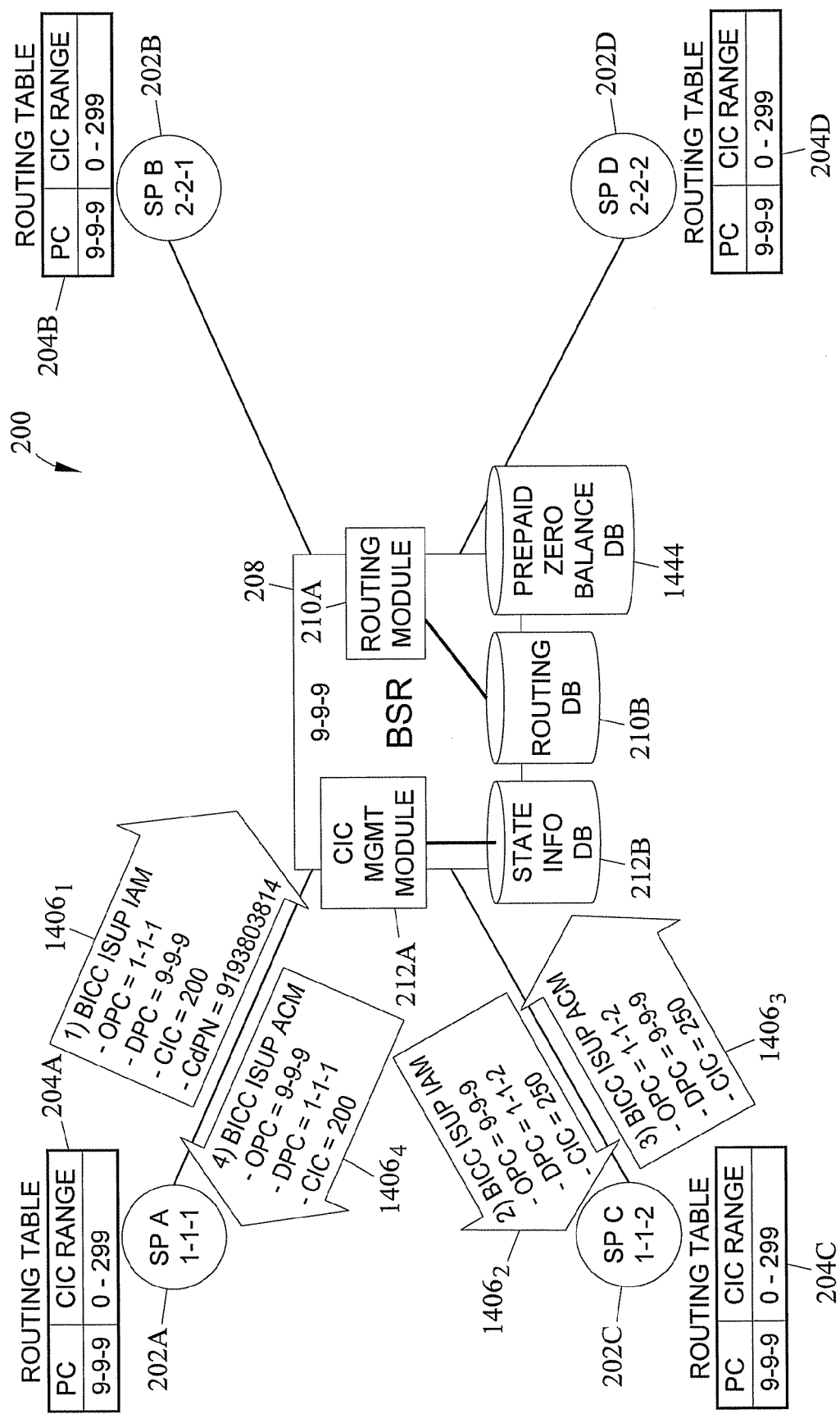
FIG. 14 is a network diagram where the BSR is configured for performing prepaid zero balance screening, according to an embodiment of the subject matter described herein.

FIG. 14 illustrates network 200 where BSR 208 is configured for performing prepaid zero balance screening, according to an embodiment of the subject matter described herein. In this embodiment, BSR 208 includes functionality for querying or accessing a prepaid zero-balance database 1444 for obtaining prepaid services information associated with a calling or called party. BSR 208 may use information obtained from prepaid zero-balance database 1444 for determining whether a calling or called party has a zero or near-zero prepaid credit balance. BSR 208 may use the prepaid zero balance screening function to determine whether to allow call setup to occur or continue with call setup.

For example, BSR 208 may receive a call setup message $1406_1$ from originating node SP A 202A. BSR 208 may access prepaid zero-balance database 1444 and determine that a called or calling party does not have sufficient prepaid credit for the requested call. BSR 208 may respond to the originating SP with an end or release message, thereby effectively blocking and preventing the call. Alternatively, BSR 208 may determine that there is sufficient prepaid credit for the requested call. If there is sufficient prepaid credit for the requested call, BSR 208 may process, modify, and route call setup message $1406_1$ as appropriate. For example, BSR 208 may determine and select an appropriate SP (i.e., SP C 202C) and select an available CIC (i.e., 250) associated with SP C 202C for sending message $1406_1$. BSR 208 may record necessary state information, modify message $1406_1$ to include the selected CIC and point code of SP C 202C, and route modified message $1406_2$ to SP C 202C.

Further, in this embodiment, BSR 208 may be adapted to identify calls to emergency service-related called party (e.g., 911 call), and to permit such calls regardless of prepaid credit balance. Also, calls to the pre-paid service provider may also be identified and allowed regardless of prepaid credit balance.

BSR with IP Multimedia Subsystem (IMS) Offload Functionality

Figure 15:
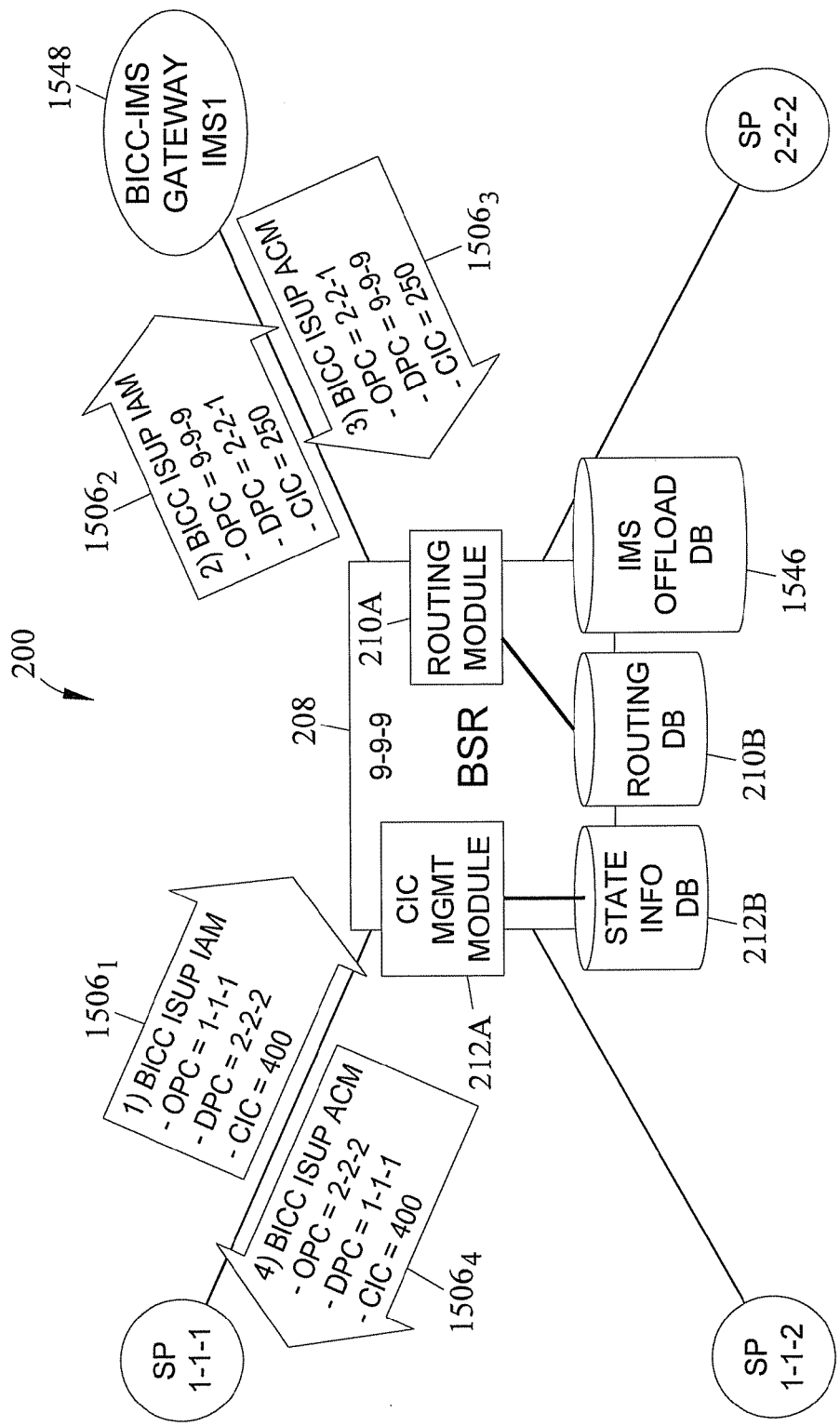
FIG. 15 is a network diagram where the BSR is configured for performing IP multimedia subsystem (IMS) offloading, according to an embodiment of the subject matter described herein.

FIG. 15 illustrates network 200 where BSR 208 is configured for performing IMS offloading, according to an embodiment of the subject matter described herein. In this embodiment, BSR 208 includes or has access to an IMS offload database 1546 for determining whether a message or a signaling session should be offloaded to an IMS network.

For example, an originating node SP A 202A may select an available CIC associated with BSR 208. A call setup message $1506_1$ may be generated and sent to BSR 208. Call setup message $1506_1$ may include a CIC, a CgPN identifier, and a CdPN identifier. BSR 208 may receive call setup message $1506_1$ and examine the CIC value specified in message $1506_1$. BSR 208 may determine, using the CgPN or CdPN, that message $1506_1$ should be offloaded to an IMS network. BSR 208 may maintain information in IMS offload database 1546 usable for making this determination. In the event that it is determined that the call should be offloaded to an IMSP network, BSR 208 may determine and select a BICC/SIP (e.g., BICC/IMS) gateway node 1548 as an intermediate destination for the call. BSR 208 may select a CIC associated with the chosen BICC/SIP gateway 1548. BSR 208 may record necessary state information. BSR 208 may modify message $1506_1$ to include the selected CIC and point code of BICC/SIP gateway 1548. BSR 208 may route modified message $1506_2$ to the BICC/SIP gateway 1548.

BSR with SIP Interworking Functionality

Figure 16:
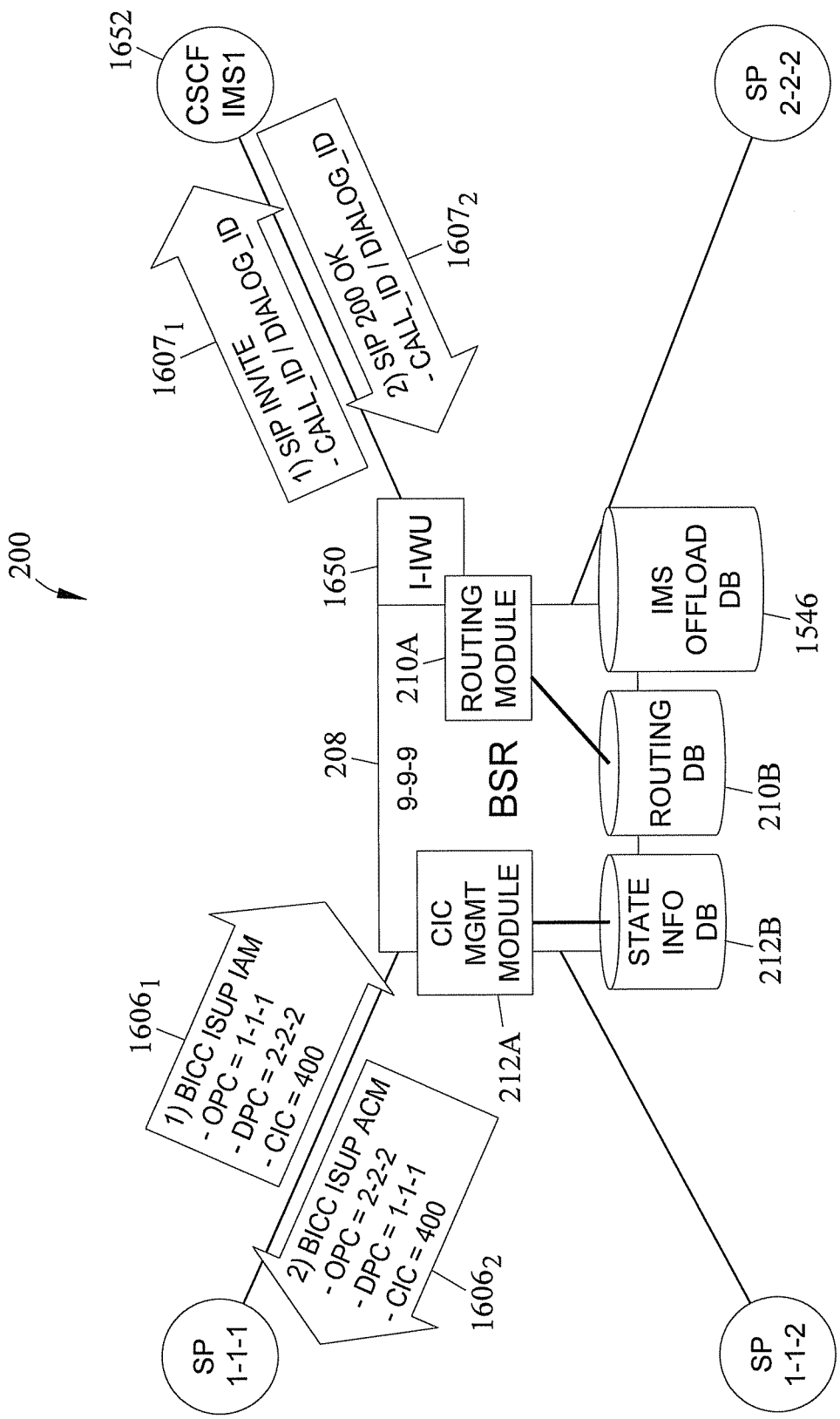
FIG. 16 is a network diagram where the BSR is configured for performing session initiation protocol (SIP) interworking, according to an embodiment of the subject matter described herein.

FIG. 16 illustrates network 200 where BSR 208 is configured for performing session initiation protocol (SIP) interworking, according to an embodiment of the subject matter described herein. In this embodiment, BSR 208 includes or has access to IMS offload database 1546 for determining whether a message should be offloaded to a SIP network and further includes functionality for generating, sending, and receiving SIP messages 1607.

For example, an originating node SP A 202A may select an available CIC associated with BSR 208. A call setup message $1606_1$ may be generated and sent to BSR 208. Call setup message $1606_1$ may include a CIC, a CgPN identifier, and a CdPN identifier. BSR 208 may receive call setup message $1506_1$ and examine the CIC value specified in message $1606_1$. BSR 208 may determine, using the CgPN or CdPN, that message $1606_1$ should be offloaded to an IMS network. BSR 208 may maintain information in IMS offload database 1546 used in making this determination. In the event that it is determined that the call should be offloaded to an IMS network, BSR 208 may terminate the call setup message $1606_1$ (e.g., BICC ISUP IAM message) and generates a SIP INVITE message $1607_1$ where SIP INVITE message $1607_1$ is addressed to an SIP call session control function (CSCF) node 1652. BSR 208 may include or act as an IMS-interworking unit (I-IWU) 1650 as defined by ITU-T specification Q-1912.5. BSR 208 may specify a unique Dialog_ID and or Call_ID parameter value to be sent to CSCF 1652, and may map the originally specified CIC (e.g., 400) to the newly created Call_ID value. This CIC-Call_ID mapping, along with a source-destination node address mapping, may be maintained by BSR 208. Additional state information may also be maintained by BSR 208 related to the call or signaling session. CSCF node 1652 may send a response SIP message $1607_2$ back using an available CIC associated with BSR 208. BSR 208 may use the recorded state information to modify response SIP message $1607_2$ into message $1606_2$ and route message $1606_2$ to originating node SP A 202A.

BSR may use the maintained state information to dynamically determine how BICC traffic should be routed or load-shared among BICC and SIP nodes in a hybrid BICC-SIP networking environment. BSR 208 may process subsequent messages associated with the call, as necessary, to insure continuity of the call or signaling session.

Figure 17:
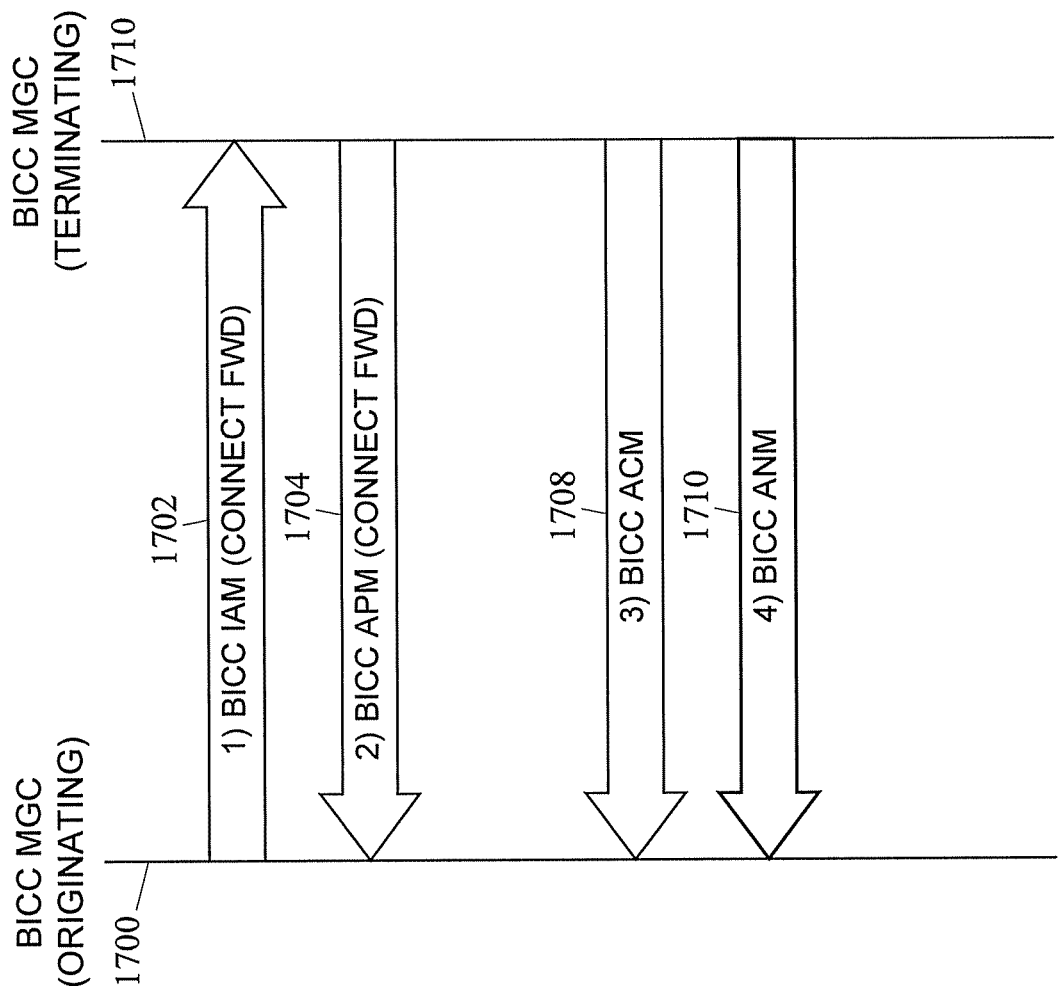
FIG. 17 is a message flow chart illustrating BICC signaling used for establishing a call.

FIG. 17 is a message flow diagram illustrating conventional BICC signaling for establishing a call. As shown, BICC MGC 1700 is the originating node of a call in this example and BICC MGC 1710 is the terminating node. MGC 1700 sends a BICC IAM 1702 to MGC 1710 for establishing a call. MGC 1710 responds by sending a BICC application transport message (APM) 1704 back to MGC 1700. Using the information communicated, a bearer connection is established for a call. The bearer connection may be established between media gateways (not shown) respectively controlled by MGCs 1700 and 1710. MGC 1710 sends an address complete message (ACM) 1708 to MGC 1700 when the subscriber has been reached, indicating the phone is ringing. MGC 1710 sends an answer message (ANM) 1710 to MGC 1700 when the called party answers the phone.

Figure 18:
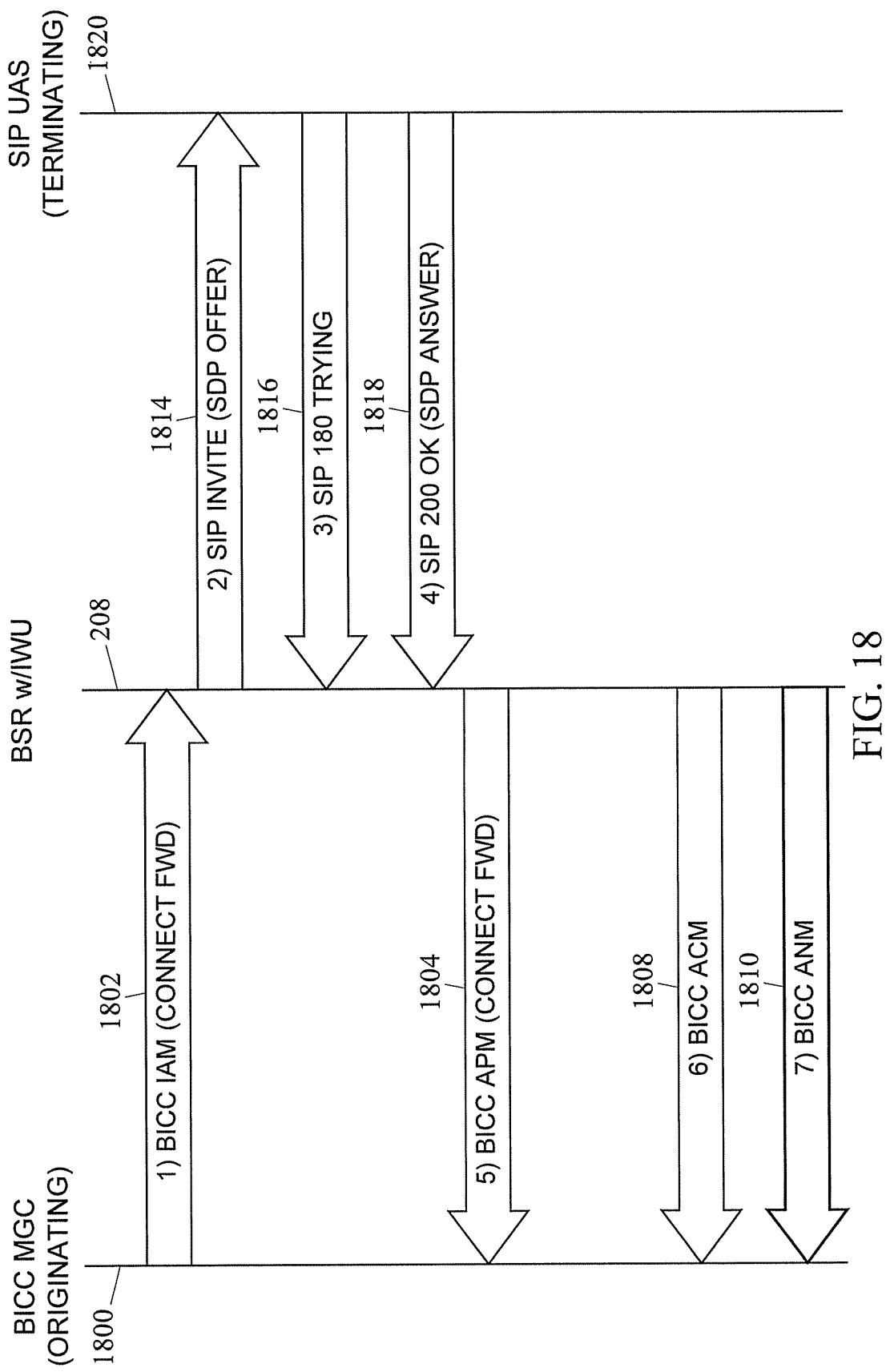
FIG. 18 is a flow chart illustrating BICC signaling using the BSR as illustrated in FIG. 16 for establishing a call with a SIP network, according to an embodiment of the subject matter described herein.

FIG. 18 is a message flow chart illustrating BICC signaling using BSR 208 as illustrated in FIG. 16 for establishing a call with a SIP network, according to an embodiment of the subject matter described herein. As shown, BICC MGC 1800 is the originating signaling node of a call in this example, BSR 208 with SIP interworking functionality (BSR w/IWU) and SIP user agent server (UAS) 1820 is the terminating node. MGC 1800 sends a BICC IAM 1802 to BSR 208 for establishing a call. BSR 208 determines that message 1802 should be offloaded to a SIP network. BSR 208 terminates message 1802 and generates a SIP INVITE message 1814. BSR 208 sends message 1814 to SIP UAS 1820. SIP UAS 1820 sends a SIP 180 trying message 1816 back to BSR 208, indicating the called party is trying to be reached. SIP UAS 1820 sends a SIP 200 OK message 1816 back to BSR 208 when INVITE message 1814 is accepted. BSR 208 sends a BICC application transport message (APM) 1804 back to MGC 1800. Using the information communicated, a bearer connection is established between a media gateway (not shown) controlled by MGC 1800 and a SIP user agent client (not shown) associated with SIP UAS 1820. BSR 208 sends an address complete message (ACM) 1808 to MGC 1700 when the subscriber has been reached, indicating the phone is ringing. BSR 208 sends an answer message (ANM) 1810 to MGC 1800 when the called party answers the phone.

Figure 19:
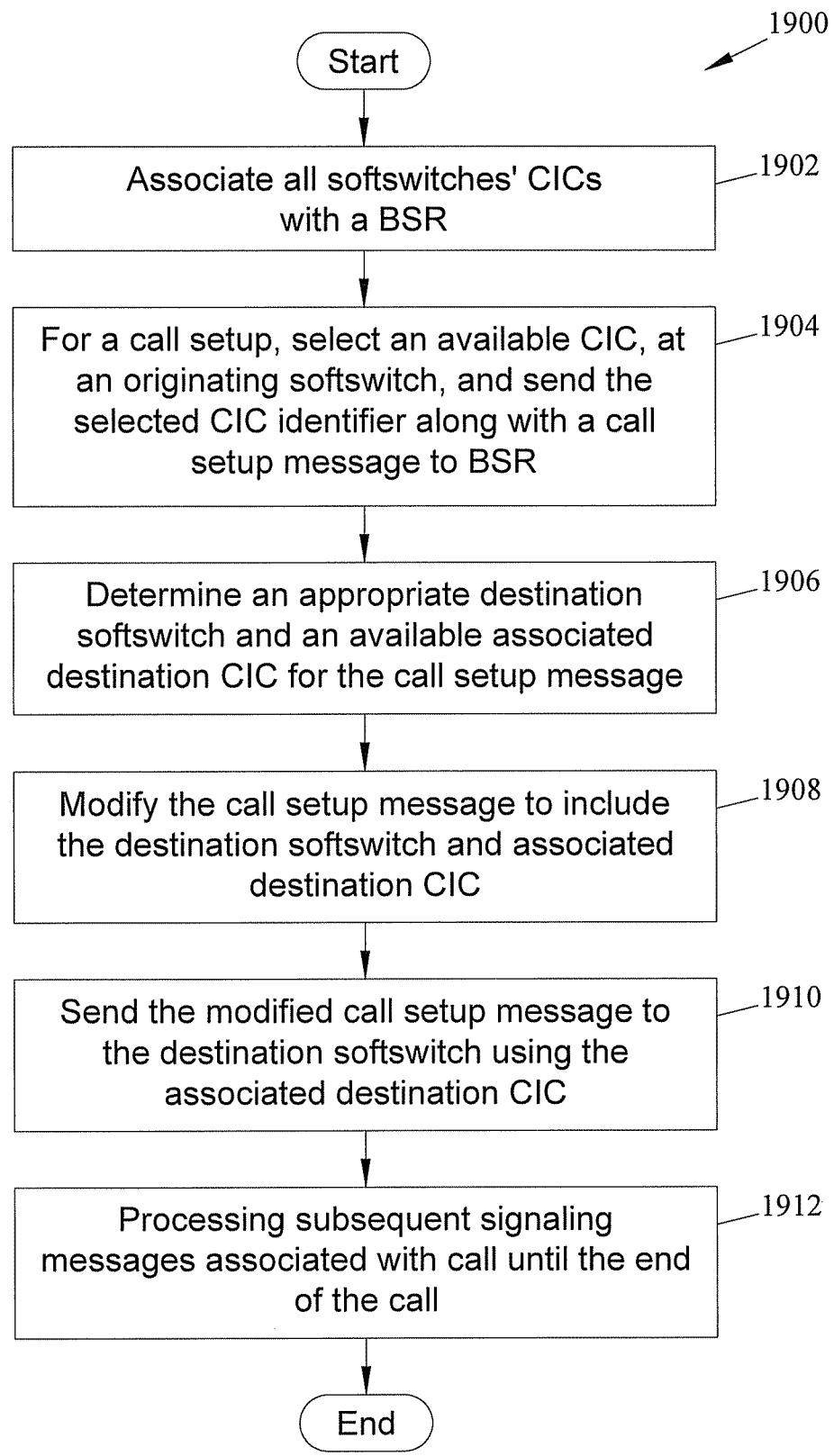
FIG. 19 is a flow chart illustrating exemplary steps for performing centralized routing using a BSR, according to an embodiment of the subject matter described herein.

FIG. 19 is a flow chart 400 illustrating exemplary steps for performing centralized routing at the BSR 208, according to an embodiment of the present subject matter. Flow chart 400 begins at step 402. In step 402, each SP 202A-D of the BICC network 200 associates all of its CICs with the BSR 208. In step 404, an SP (e.g., SP A 202A) selects an available CIC before generating and sending, using the selected CIC, a call setup message 206$_1$ including the selected CIC in the message 206$_1$. In step 406, the BSR 208 determines and selects an appropriate destination SP (e.g., SP B 202B) and an available CIC associated with that destination SP for the message 206$_1$ using the message 206$_1$ and maintained information about the network 200. In step 408, the BSR 208 modifies the message 206$_1$ (e.g., with a new DPC and CIC). In step 410, the BSR 208 routes the modified message 206$_2$ to the destination SP (e.g., SP B 202B). In step 412, the BSR 208 remains in the call signaling path processing subsequent BICC signaling messages associated with the call until the end of the call or signaling session.

Figure 20:
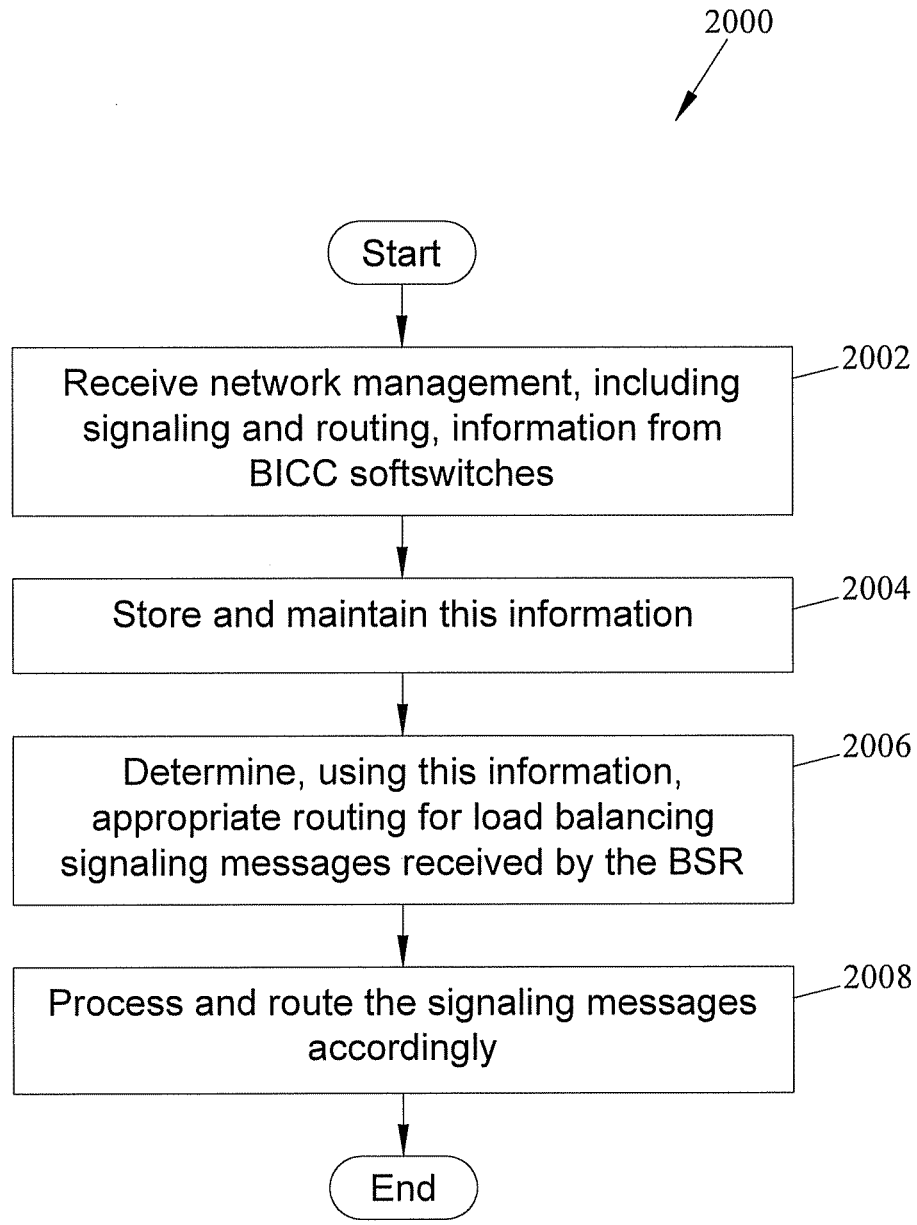
FIG. 20 is a flow chart illustrating exemplary steps for performing load balancing at the BSR illustrating in FIG. 2, according to an embodiment of the subject matter described herein.

FIG. 20 is a flow chart 500 illustrating exemplary steps for performing load balancing at BSR 208, according to an embodiment of the present subject matter. Flow chart 500 begins at step 502. In step 502, the BSR 208 is configured to receive network management information, including signaling and routing information, from the SPs 202 in the BICC network 200. In step 504, the BSR 208 is configured to store and maintain this information including responding appropriately. For example, if SP D 202D sends a congested or overload message 206$_3$ to the BSR 208, the BSR 208 may update the status information of SP D 202D maintained by the BSR 208. In step 506, the BSR 208 uses this maintained information to determine appropriate routing for load balancing signaling messages received by the BSR 208. In step 508, the BSR 208 processes and routes the received messages accordingly. For example, the BSR 208 may route messages 206 for a congested SP D 202D to a backup node like SP B 202B until SP D 202D is no longer congested.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for routing bearer independent call control (BICC) signaling messages and managing call instance code assignments, the system comprising:
   a BICC signaling router having a processing and a memory, the BICC signaling router including:
   a routing module for centralized routing BICC signaling messages between a plurality of BICC signaling nodes;
   a call instance code management module for centralized assignment of call instance codes for BICC signaling sessions routed through the BICC signaling router, wherein centralized assignment of call instance codes includes assigning call instance codes for BICC signaling sessions without bilateral agreement between endpoints, wherein the BICC signaling router assigns an available call instance code associated with a destination BICC signaling node in response to receiving a BICC signaling message from an originating BICC signaling node, wherein the originating BICC signaling node is unaware of the call instance code associated with the destination BICC signaling node when sending the BICC signaling message; and
   wherein, in response to receiving the BICC signaling message from the originating BICC signaling node, the routing module and the call instance code management module are configured to:
   determine the destination BICC signaling node for the BICC signaling message;
   select the available call instance code associated with the destination;
   insert the available call instance code in the BICC signaling message;
   route the BICC signaling message to the destination;
   maintain a mapping between the call instance code in the received BICC signaling message and the selected call instance code associated with the destination; and
   use the mapping to process subsequent signaling messages associated with the signaling session.

2. The system of claim 1 wherein each BICC signaling node associates a single call instance code with the BICC signaling router.

3. The system of claim 1 wherein each BICC signaling node associates all call instance codes with the BICC signaling router.

4. The system of claim 1 wherein the BICC signaling router is configured to store status information about the BICC signaling nodes and to use the status information in assigning the call instance codes for the signaling sessions.

5. The system of claim 1 wherein the BICC signaling router is configured to query one of: a number portability database, an advanced routing database, a short code database, voice mail service database, an IMS offload database, and a toll free database to obtain information usable to route messages associated with the signaling sessions.

6. The system of claim 1 wherein the BICC signaling router is configured to query one of: a prepaid services database and a prepaid zero balance screening database to determine whether to allow prepaid bearer communications associated with one of the signaling sessions to proceed.

7. The system of claim 1 wherein the BICC signaling router includes an interworking unit (IWU) for BICC-SIP interworking.

8. The system of claim 1 wherein the BICC signaling router is configured to generate and store call detail records (CDRs) associated with the signaling session.

9. The system of claim 1 wherein the BICC signaling router is configured to query one of a home location register (HLR) and a home subscriber server (HSS) using information in a received BICC signaling message to determine mobile subscription information for a called party associated with an associated signaling session.

10. The system of claim 1 wherein the BICC signaling router is configured to generate presence update messages using information from the BICC signaling messages.

11. A method for centralized routing and call instance code management in a bearer independent call control (BICC) network, the method comprising:
at a BICC signaling router:
    performing centralized routing of BICC signaling messages between BICC signaling nodes, wherein centralized routing of call instance codes includes assigning call instance codes for BICC signaling sessions without bilateral agreement between endpoints, wherein the BICC signaling router assigns an available call instance code associated with a destination BICC signaling node in response to receiving a BICC signaling message from an originating BICC signaling node, wherein the originating BICC signaling node is unaware of the call instance code associated with the destination BICC signaling node when sending the BICC signaling message;
    performing centralized management of call instance codes for the BICC signaling sessions; and
    wherein performing the centralized routing of BICC signaling messages and centralized management of call instance codes comprises:
    determining the destination signaling node for the received BICC signaling message;
    selecting the available call instance code associated with the destination;
inserting the available call instance code in the BICC signaling message;
    routing the BICC signaling message to the destination;
    maintaining a mapping between the call instance code in the received BICC signaling message and the selected call instance code associated with the destination; and
    using the mapping to process subsequent signaling messages associated with the signaling session.

12. The method of claim 11 comprising, from the BICC signaling router querying one of: a number portability database, an advanced routing database, a short code database, voice mail service database, an IMS offload database, and a toll free database to obtain information usable to route messages associated with the signaling sessions.

13. The method of claim 11 comprising, from the BICC signaling router, querying one of: a prepaid services database and a prepaid zero balance screening database to determine whether to allow prepaid bearer communications associated with one of the signaling sessions to proceed.

14. A non-transitory computer readable medium having stored thereon computer executable instructions that when executed by the processor of a computer perform steps comprising:
at a BICC signaling router:
    performing centralized routing of BICC signaling messages between BICC signaling nodes, wherein centralized routing of call instance codes includes assigning call instance codes for BICC signaling sessions without bilateral agreement between endpoints, wherein the BICC signaling router assigns an available call instance code associated with a destination BICC signaling node in response to receiving a BICC signaling message from an originating BIC signaling node, wherein the originating BICC signaling node is unaware of the call instance code associated with the destination BICC signaling node when sending the BICC signaling message;
    performing centralized management of call instance codes for the BICC signaling sessions; and
    wherein performing the centralized routing of BICC signaling messages and centralized management of call instance codes comprises:
    determining the destination signaling node for the received BICC signaling message;
    selecting the available call instance code associated with the destination;
inserting the available call instance code in the BICC signaling message;
    routing the BICC signaling message to the destination;
    maintaining a mapping between the call instance code in the received BICC signaling message and the selected call instance code associated with the destination; and
    using the mapping to process subsequent signaling messages associated with the signaling session.

15. The computer readable medium of claim 14 comprising, from the BICC signaling router querying one of: a number portability database, an advanced routing database, a short code database, voice mail service database, an IMS offload database, and a toll free database to obtain information usable to route messages associated with the signaling sessions.

16. The computer readable medium of claim 14 comprising, from the BICC signaling router, querying one of: a prepaid services database and a prepaid zero balance screening database to determine whether to allow prepaid bearer communications associated with one of the signaling sessions to proceed.

17. The computer readable medium of claim 14 comprising generating presence update messages using the information from the BICC signaling messages.

* * * * *